US 6,681,239 B1
Jan. 20, 2004

(12) United States Patent
Munroe et al.

(54) COMPUTER SYSTEM HAVING SHARED ADDRESS SPACE AMONG MULTIPLE VIRTUAL ADDRESS SPACES

(75) Inventors: Steven Jay Munroe, Rochester, MN (US); Scott Alan Plaetzer, Rochester, MN (US); James William Stopyro, Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 964 days.

(21) Appl. No.: 08/771,550

(22) Filed: Dec. 23, 1996

(51) Int. Cl.$^7$ .................................. G06F 9/00

(52) U.S. Cl. ........................ 709/104; 709/312

(58) Field of Search ................. 711/207, 203; 395/674, 680; 709/104, 300, 312, 102, 107

(56) References Cited

U.S. PATENT DOCUMENTS

| | | | | |
|---|---|---|---|---|
| 4,455,602 A | | 6/1984 | Baxter, III et al. | 364/200 |
| 5,123,094 A | * | 6/1992 | MacDougall | 395/375 |
| 5,347,649 A | * | 9/1994 | Alderson | 395/600 |
| 5,581,765 A | | 12/1996 | Munroe et al. | 395/677 |
| 5,729,710 A | * | 3/1998 | Magee et al. | 395/413 |
| 5,752,249 A | * | 5/1998 | Macon | 707/103 |
| 5,771,383 A | * | 6/1998 | Magee et al. | 395/680 |
| 5,790,852 A | * | 8/1998 | Salm | 395/674 |

FOREIGN PATENT DOCUMENTS

| | | | |
|---|---|---|---|
| EP | 0327798 | 8/1989 | G06F/12/14 |
| EP | 0398695 | 11/1990 | G06F/15/16 |
| GB | 2282470 | 4/1995 | G06F/12/10 |

OTHER PUBLICATIONS

J. Chase, et al, "Sharing and Protection in a Single-Address-Space Operating System", ACM Trans. Computer Systems, pp. 271–307, Nov. 1994.*

P. Amaral, et al, "A model for persistent shared memory addressing in distributed systems", IWOOOS'92, Chorus Systems, Sep. 1992.*

S. Jagannathan, et al, "A Reseach Prospectus for Advanced Software Systems", NEC Research Institute, 1995.*

Y. Jiang, et al, "Integrating Parallel Functions into the Manipulation for Distributed Persistent Objects", IEEE, pp. 76–82, 1996.*

(List continued on next page.)

*Primary Examiner*—Sue Lao
(74) *Attorney, Agent, or Firm*—Roy W. Truelson

(57) ABSTRACT

A multi-tasking computer operating system allocates a respective virtual address space to each task. A portion of virtual address space is reserved as a shared address space (SAS) region, the SAS region occupying the same range of virtual addresses in the virtual address space of each task. Certain classes of data intended for sharing among multiple tasks are assigned unique and persistent addresses in the range of the shared address space region. Preferably, certain facilities are added to a conventional base operating system to support the SAS region and associated function. These include a join facility for initiating a task to the SAS region, an attach facility for attaching blocks of memory within the SAS region, and a paging facility for retrieving a page within the SAS region from storage. In this manner, it is possible for a multi-tasking multiple virtual address space computer system to assume the advantages of a single level store computer system when performing certain tasks.

31 Claims, 20 Drawing Sheets

OTHER PUBLICATIONS

"Using Captured Storage for Accessing Debug Break Points and Storage," IBM Technical Disclosure Bulletin, pp. 261–263, Dec. 1, 1996.*

"AS/400 System Overview," Ronald O. Fess et al., IBM Application System/400 Technology, pp. 2–10, Jun. 1988.

"Introduction to IBM System/38 Architecture," G. G. Henry, IBM System/38 Technical Developments, pp. 3–6, Dec. 1978.

"System/38—A High–Level Machine," S. H. Dahlby et al., IBM System/38 Technical Developments, pp. 47–58, Dec. 1978.

"Lightweight Shared Objects in a 64–Bit Operating System," Jeffrey S. Chase et al. In Proc. of the Conference on Object–Oriented Programming Systems, Languages, and Applications (OOPSLA), Oct. 1992.

"Architectural Support for Single Address Space Operating Systems," Eric J. Koldinger et al. In Proc. of the 5th Int. Conference on Architectural Support for Programming Languages and Operating Systems (ASPLOS), Oct. 1992.

"Integrating Coherency and Recoverability in Distributed Systems," Michael J. Feeley et al. In Proc. of the First Symposium on Operating Systems Design and Implementation, Nov. 1994.

"Sharing and Protection in a Single Address Space Operating System," Jeffrey S. Chase et al. ACM Transactions on Computer Systems, 12(4), Nov. 1994.

"Implementing Global Memory Management in a Workstation Cluster," Michael J. Feeley et al., In Proc. of the 15th ACM Symposium on Operating Systems Principles, Dec. 1995.

"Opal: A Single Address Space System for 64–bit Architectures," Jeff Chase et al. In Proc. IEEE Workshop on Workstation Operating Systems, Apr. 1992.

"Using Virtual Addresses as Object Referecnes," Jeff Chase et al. In Proc. 2nd Int. Workshop on Object Orientation in Operating Systems, Sep. 1992.

"Some Issues for Single Address Space Systems," Jeff Chase et al. In Proc. of the Fourth IEEE Workshop on Workstation Operating Systems, Oct. 1993.

"Supporting Cooperation on Wide–Address Computers," Jeffrey S. Chase et al. Technical Report Mar. 3, 1991, Department of Computer Science and Engineering, University of Washington.

"The Protection Lookaside Buffer: Efficient Protection for Single Address–Space Computers," Eric J. Koldinger et al. Technical REport Nov. 5, 1991, Department of Computer Science and Engineering, University of Washington.

"How to Use a 64–Bit Virtual Address Space," Jeffrey S. Chase et al. Technical Report Mar. 2, 1999, Department of Computer Science and Enginering, University of Washington.

"User–level Threads and Interprocess Communications," Michael J. Freeley et al. Technical Report Feb. 3, 1993, Department of Computer Science and Engineering, University of Washington.

"Fine–Grained Mobility in the Emerald System," Eric Jul et al. ACM Trans. on Computer Systems 6(1), Feb. 1988.

"The Amber System: Parallel Programming on a Network of Multiprocessors," Jeffrey S. Chase et al. Proc. of the 12th ACM Symposium on Operating Systems Principles, Dec. 1989.

"An Operating System Structure for Wide–Address Architectures," Jeffrey S. Chase. Technical Report Aug. 6, 1995, Department of Computer Science and Engineering, University of Washington.

"Distribution in a Single Address Space Operating System," Jeff Chase et al. Department of Computer Science and Engineering, University of Washington.

"Shared Memory Suport for Object–based RPC," Rene' W. Schmidt et al. Department of Computer Science and Engineering, University of Washington.

* cited by examiner

| Task ID | Virtual Address |
|---------|-----------------|
| Task ID | Virtual Address |
| Task ID | Virtual Address |
| ⋮ | ⋮ |

| Cohort ID | C M P | Media ID |
|---|---|---|
| Cohort ID | C M P | Media ID |
| Cohort ID | C M P | Media ID |
| ⋮ | ⋮ | ⋮ |

FIG. 8

| Next Block Address ||
|---|---|
| Media Device List ||
| Virtual Address | Authority Control |
| Virtual Address | Authority Control |
| Virtual Address | Authority Control |
| ⋮ | ⋮ |

| Virtual Address | Device ID | Sector | Length |
|---|---|---|---|
| Virtual Address | Device ID | Sector | Length |
| Virtual Address | Device ID | Sector | Length |
| ⋮ | ⋮ | ⋮ | ⋮ |

| Device ID | Sector | Length |
|---|---|---|
| Device ID | Sector | Length |
| Device ID | Sector | Length |
| ⋮ | ⋮ | ⋮ |

| Mem Obj ID | Virt addr | Cohort ID | Media ID | Auth Cntl | Cnt |
|---|---|---|---|---|---|
| Mem Obj ID | Virt addr | Cohort ID | Media ID | Auth Cntl | Cnt |
| Mem Obj ID | Virt addr | Cohort ID | Media ID | Auth Cntl | Cnt |
| ... | ... | ... | ... | ... | |

FIG. 12

COMPUTER SYSTEM HAVING SHARED ADDRESS SPACE AMONG MULTIPLE VIRTUAL ADDRESS SPACES

FIELD OF THE INVENTION

The present invention relates to digital computer systems, and in particular computer operating systems which support multiple simultaneous tasks.

BACKGROUND OF THE INVENTION

A modem computer system typically comprises a central processing unit (CPU), and other supporting hardware such as system memory, communications busses, input/output controllers, storage devices, etc. The CPU is the heart of the system. It executes the instructions which comprise a computer program and directs the operation of the other system components. Typically, the instructions which execute on the CPU may be part of the computer's operating system, or may be part of an application program which performs some particular work for a user.

The operating system may be thought of as that part of the programming code executing on the computer, which regulates the computer's function, while the application programs perform specific work on behalf of a user. Operating systems vary considerably in complexity and function. A very simple operating system for a single-user computer may handle only a single task at a time, mapping all data into a single address space, and swapping data into and out of the address space whenever a new task must be performed. An operating system for a computer which supports multiple simultaneous users must manage the allocation of system resources among the different users. In particular, it must manage the allocation of address space and system memory.

The address space of the system is the range of addresses available to reference data, instructions, etc., and is determined by the size (bit length) of the address. Usually, the address space is significantly larger than the number of actual physical memory locations available on the system. The address size is one of the fundamental architectural features of the computer system. All other things being equal, a larger address size is naturally desirable from the standpoint of capacity of the system to do work. However, the address size entails significant hardware cost. The size of buses, registers, and logic units throughout the system is intimately tied to the address size.

In the early days of computers, hardware was a relatively expensive commodity. Many early systems used 16-bit or smaller addresses. Usually, the amount of data contained in these systems exceeded the size of the address space. An individual program might fit well within the address space, but a user might have many programs to execute on the system. Additionally, multi-user systems required space for each user.

The earliest systems executed only a single application at a time. Typically, storage became hierarchical. Although the total number of addresses exceeded the address space available in main memory, address space could be re-used. Data (including programs) were normally stored in a large secondary storage on disk, drum, tape or other secondary storage devices. When a particular application was needed, it was loaded into main memory and addresses were mapped into the address space of main memory. When no longer needed, it was deleted from main memory but retained in secondary storage. The address space was then re-used. If the same application was needed again, it could be loaded again into main memory.

As computers became more sophisticated, it became common for computer systems to execute multiple tasks concurrently. Operating systems designed for such computer systems were required to manage operations within the available address space of the computer. Since the addresses needed typically exceeded the address space available in the processor's hardware, this was done by allocating a separate address space to each task, resulting in multiple virtual address spaces. Typically, the task's virtual address space was the same size as the address space of the computer's processor.

This multiple virtual address space approach necessarily meant that different bytes of data might have the same virtual address, although they would be in the virtual address spaces of different tasks. When a task was loaded into main memory from secondary storage, a mapping mechanism mapped virtual addresses in the virtual address space of the task to physical addresses in the main memory of the computer system. This increased the complexity of the operating system, but was necessary to cope with the limited size of the system's address space.

As an alternative to the multiple virtual address space architecture, it possible to utilize a single very large system address space, one which is sufficiently large that it is not necessary to have multiple overlapping virtual address spaces, one for each task. Each task has its own discrete portion of the large system address space. One major impediment to this alternative architecture is that is requires a very large system address space, and consequently requires additional hardware to support it. When hardware was very expensive, this alternative appeared unattractive. For that reason, most multi-tasking systems have utilized the multiple virtual address space approach.

With the alternative single large address space approach, programs and other data stored in a computer system can be assigned persistent, unique logical addresses in the large system address space. Because these logical addresses are not duplicated, they can be used to identify data either in main memory or in secondary memory. For this reason, this alternative is sometimes referred to as a single level storage architecture. Examples of such an alternative architecture are the IBM System/38 computer system (formerly manufactured and distributed by IBM Corporation), its successor, the IBM AS/400 System (currently manufactured and distributed by IBM Corporation), and the Opal system at the University of Washington. For additional background concerning the IBM System/38 and IBM AS/400 System, see *IBM System/38 Technical Developments* (International Business Machines Corporation, 1978), *IBM Application System/400 Technology* (International Business Machines Corporation, 1988), and *IBM Application System/400 Technology Journal*, Version 2 (International Business Machines Corporation, 1992). The Opal system is described in a series of academic papers, including J. Chase, et al., "Opal: A Single Address Space System for 64-bit Architectures", *Proc. IEEE Workshop on Workstation Operating Systems* (April, 1992).

When compared with the more traditional multiple virtual address space approach, the single level storage architecture offers certain advantages. These advantages are particularly applicable to object oriented programming applications. The object oriented (OO) programming paradigm anticipates that a large number of small code segments will have internal references (pointers) to one another, that these segments may be owned by different users, that during execution of a task, flow of control may jump frequently from one segment to another, and that different tasks executing on behalf of different users will often execute the same code segment.

Where a system uses multiple virtual address spaces, the pointers to different code segments will reference code in the virtual address space of another task or user. Resolution of these pointers becomes difficult. Because multiple overlapping virtual address spaces exist, it is possible that different code segments will share the same virtual address, but in the address space of different tasks or users. It is also possible that the executing task will have assigned the virtual address to some other data. Therefore, it is not possible to directly reference data or code in a segment belonging to a different task or user in the same manner an executing task would use a pointer to its own code in its own virtual address space. There must be a mechanism for resolving the various pointers so that the correct code segment is referenced.

Such mechanisms for resolving pointers in a multiple virtual address space system are possible, but they are awkward and tend to impose a burden on system performance. On the other hand, a single level store architecture can cope with such pointers more easily. Because each code or other data segment will have its own logical address in the single large system address space, there is no need for a mapping mechanism when referencing another code or data segment, even where that code or data is controlled by another task or user. It may be necessary to have a mechanism for verifying access rights, but the pointer addresses themselves do not need to be re-mapped for each new task. This is a substantial advantage where many pointers are used to point to code or other data segments of different tasks or users, and task execution can flow unpredictably from one to another.

Recently, there has been a significant interest in the object-oriented (OO) programming paradigm. The number of OO applications available is rapidly mushrooming. Object-oriented applications are not the only ones which may have pointers referencing code or other data controlled by different users. But OO application rely heavily on these types of operations. As object-oriented applications become more common, the burden of resolving pointers in a multiple virtual address space environment increases.

Another development in the evolution of the computer industry has been the relative decline in hardware costs. Historically, the size of addresses has grown as hardware costs have declined. The earlier 16-bit address based systems have largely been supplanted by 32-bit system. More recently, several commodity processors have been introduced having 64-bit address capability.

Unlike the earlier increases in address size, the increase in size to 64 bits has a revolutionary potential. Even where every task has its own range of addresses and every new piece of data is assigned a persistent address which is not re-used, it is unlikely that all the addresses in a 64-bit address space will be consumed in the lifetime of a given computer system. Thus, a 64-bit address is large enough to support a single level storage architecture. Moreover, it is a capability which is available to the system designer at no cost. Commodity processors simply offer this enormous range of addresses, whether the system designer uses them or not. At the present time, few systems have taken advantage of the full range of 64-bit address space.

The increasing use of OO applications, as well as the availability of large addresses on modern processor hardware, provide some justification for a single level storage architecture. However, architectural decisions for computer systems are not made in a vacuum. There is a long history of computer system development using the multiple virtual address space model. Any computer system architecture has its own characteristic advantages and disadvantages. Operating systems have been designed, and application software written, to take advantage of multiple virtual address spaces. Given the existing investment in these designs, it is difficult for many systems designers and users to change to a single level store architecture, despite any theoretical advantage that may be available.

It would be desirable to obtain the benefits of a single level store architecture computer system, particularly in systems which execute a significant number of OO applications. However, it is very difficult to change something so fundamental as the addressing model used in a computer system. Altering a conventional multi-tasking, multiple virtual address space system, to conform to a single level store design would typically require massive re-writing of the operating system and the application software.

SUMMARY OF THE INVENTION

It is therefore an object of the present invention to provide an enhanced computer system architecture.

Another object of this invention is to increase the performance of a computer system.

Another object of this invention is to enhance the ability of a computer system to execute multiple concurrent tasks.

Another object of this invention is to enhance the ability of a computer system to share data and code between multiple concurrent tasks.

Another object of this invention is to enhance the ability of a computer system to execute tasks involving object-oriented programming applications.

Another object of this invention is to reduce the complexity of pointer resolution among different tasks in a multi-tasking computer system.

Another object of this invention is to enhance the ability of a multi-tasking computer system having multiple virtual address spaces to provide functional advantages of a single address space computer system.

A multi-tasking operating system of a computer system allocates a respective virtual address space to each task, the virtual address spaces for the different tasks overlapping. For at least some tasks, a portion of virtual address space is reserved as a shared address space (SAS) region. These tasks are said to be "participating" in the SAS region. The SAS region occupies the same range of virtual addresses in the virtual address space of each participating task. Certain classes of data intended for sharing among multiple tasks are assigned addresses in the range of the shared address space region. Assignments of such addresses in the shared address space region are unique and persistent. In this manner, it is possible for a multi-tasking multiple virtual address space computer system to behave like a single level store computer system when performing certain tasks.

In the preferred embodiment, certain facilities are added to the base operating system of a conventional multi-tasking computer system to support the SAS region and associated function. These facilities are collectively referred to as the "SAS Server". The three chief facilities are a join facility, an attach facility, and an external paging facility.

The join facility permits a task to "join" ("participate" in) the SAS region, i.e., to take advantage of the single level storage characteristics of the SAS region. It is preferred that each task can join the SAS region individually, so that tasks are not required to join. By allowing a task to not participate in the SAS region, the operating system retains full compatibility with applications that may use portions of the SAS region for application specific purposes. A task joins a region by issuing a specific command to invoke the join facility. The SAS server maintains a record of tasks which are participating in the SAS region.

The attach facility is used by a participating task to attach blocks of memory within the SAS region. The SAS region is logically partitioned into blocks, which are the basic unit of access control. After joining the SAS region, a task can create blocks in the SAS region or attach blocks in the SAS region created by other tasks. The attach facility may either be invoked explicitly by a command to attach blocks, or implicitly by a memory reference to a location within a block which has not yet been attached. The SAS server maintains a record of attached blocks for each individual task. The fact that a task has joined the SAS region does not automatically grant it authority to access any particular block within the region. The attach facility is therefore responsible for verifying the authority of the task to access the requested block, and updating the record of attached blocks if an explicit or implicit request to access a block is successful. The SAS server also maintains a record of all persistent allocated blocks. This record enables the facility to allocate new blocks in unused address ranges, and guarantee that objects within the SAS region are loaded to consistent virtual addresses.

The external pager (called "external" because in the preferred embodiment it is external to the base operating system) manages paging within the SAS region. In the base operating system, when an executing task references a memory location, the system checks to determine whether the referenced page is currently loaded in physical memory. If not, an exception is generated by the operating system. A system default memory pager is called to bring the requested page in from storage.

This normal procedure is modified if the memory reference is within the SAS region. In that case, the exception causes the external pager to be called. The pager looks for the block in the executing task's record of attached blocks (which indicates authority to access the block containing the requested page). If the block entry is found (the block has been attached), the requested page is added to the task's page table. If necessary, the page is also loaded from storage and placed in memory (note that the page may already be in physical memory if it is used by another task). Subsequent attempts by the same task to access the same page will find it in the task's page table, so that no exception will be generated and the memory location will be accessed directly.

The above described system is a hybrid, which is neither purely a multiple address space system nor a single level store system. Because it builds upon a multiple virtual address space system, it is compatible with many existing architectures, and may execute programs written for these architectures with little or no modification. At the same time, it provides many of the advantages of single level store, e.g., improved ability to resolve pointers among different tasks and execute object-oriented applications where objects are controlled by different users.

BRIEF DESCRIPTION OF THE DRAWINGS

FIG. 7 shows the format of an active task list data structure, according to the preferred embodiment.

FIG. 8 shows the format of a cohort mapping table data structure, according to the preferred embodiment.

FIG. 9 shows the format of a cohort block index data structure, according to the preferred embodiment.

FIG. 10 shows the format of a permanent directory data structure, according to the preferred embodiment.

FIG. 11 shows the format of a free space directory data structure, according to the preferred embodiment.

FIG. 12 shows the format of an active block table data structure, according to the preferred embodiment.

DETAILED DESCRIPTION OF THE PREFERRED EMBODIMENT

System Overview

Figure 1:
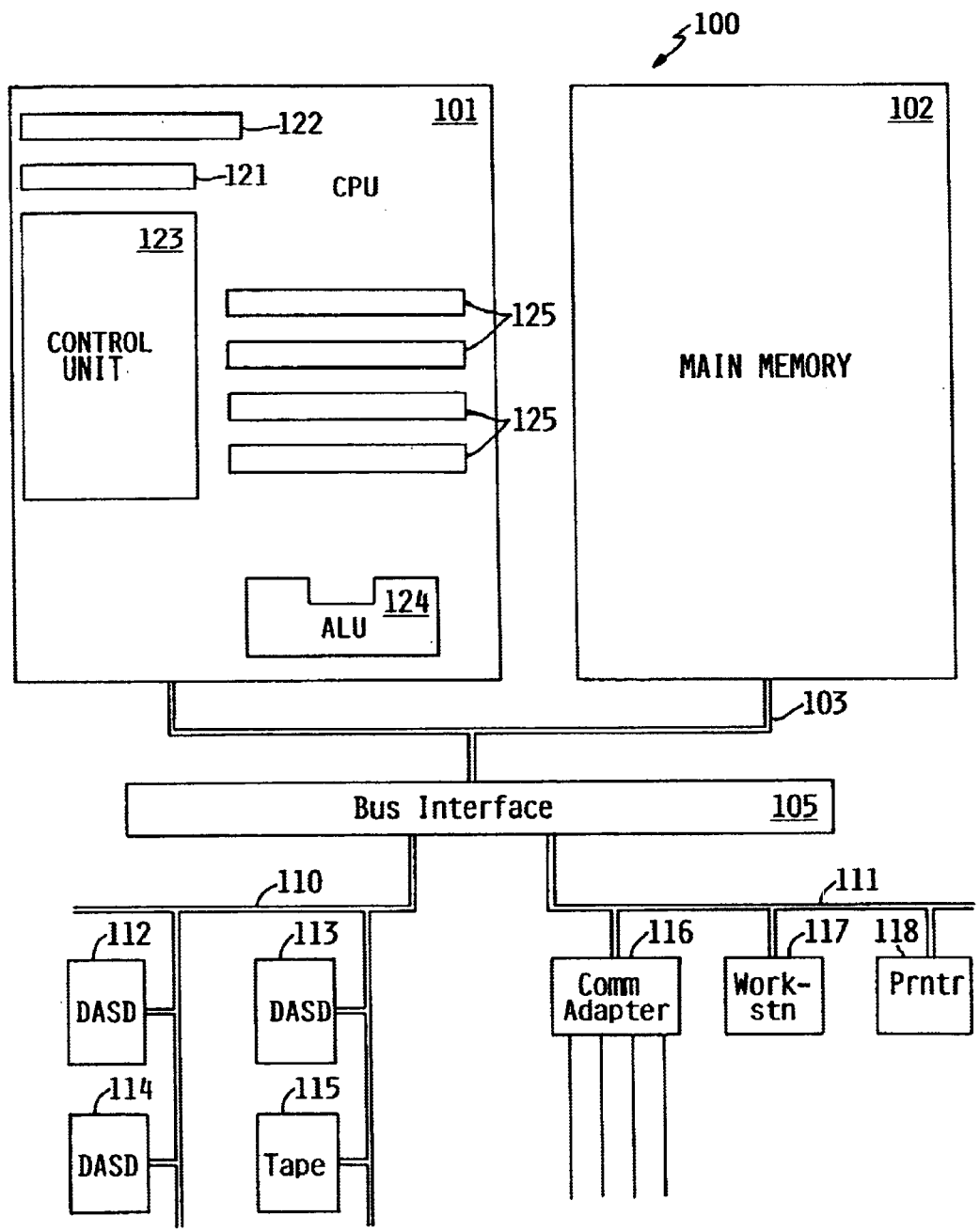
FIG. 1 is a high level diagram of the major hardware components of a computer system according to the preferred embodiment.

The major hardware components of a computer system 100 for supporting SAS regions in a multiple virtual address space environment in accordance with the preferred embodiment of the present invention are shown in FIG. 1. CPU 101 for processing instructions is coupled to random access main memory 102 via a memory bus 103. CPU 101 and main memory 102 also communicate via I/O interface 105 with I/O buses 110,111. Various I/O devices 112–118 attach to system buses 110,111, such as direct access storage devices (DASD), tape drives, workstations, printers, and remote communication lines.

FIG. 1 shows some of the major components of CPU 101. CPU 101 comprises instruction register 121 for holding the current instruction being executed by the CPU; instruction address register 122 for storing the address of an instruction; control unit 123, which decodes the instruction in register 121, determines the next instruction to be executed, and controls the flow of data internally within the CPU; arithmetic logic unit 124 for performing arithmetic and logical operations on data; and a plurality of general purpose registers 125 which can be used for temporary storage of data or addresses. Depending on the design of CPU 101, it may include various special purpose registers, caches, internal data buses, multiple arithmetic logic units, instruction registers, and instruction address registers for pipelining, and other features. In the preferred embodiment, CPU 101 is a Motorola 64-bit PowerPC processor, it being understood that various other processors could be used. It will be further understood that almost any multi-tasking computer system could be used, and that great variations are possible in the number, type and arrangement of processors, memory, busses, I/O units, etc. In particular, it would be possible to employ a system having a plurality of central processing units.

The size of registers 122 and 125 determines the maximum size of addresses that can be conveniently manipulated and addressed by CPU 101. In many current processor designs, including the processor of the preferred embodiment, it is customary to handle data and addresses in general purpose registers of the same size. While it is theoretically possible to create and manipulate larger addresses by concatenating the contents of multiple registers, this would create a substantial programming and performance burden. Therefore, the size of the registers can be said to define a virtual address space of CPU 101, this address space having a size $2^n$ addressable units, where n is the number of bits in one of the registers. In the preferred embodiment, the registers can store a 64-bit address, defining a virtual address space of $2^{64}$ bytes.

Applicants experimented with a prototype using a modified version of an IBM RISC System/6000 computer system. The RISC System/6000 computer is available from IBM Corporation, although the version used by applicants is not publicly available. However, applicants' invention is not dependent on the existence of specific hardware features not common to most, if not all, computer systems, and could therefore be implemented using any of various general purpose and special purpose computer systems.

Figure 2:
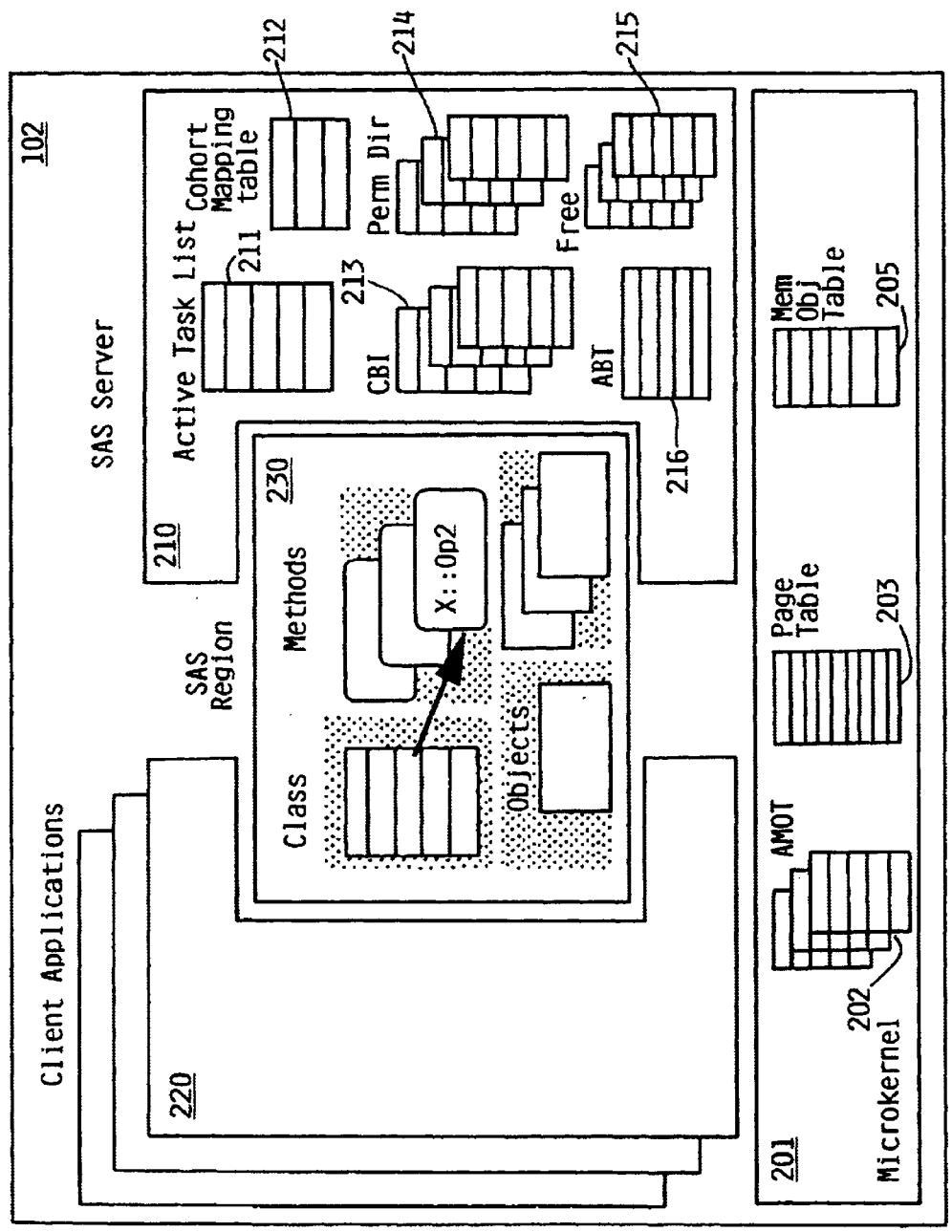
FIG. 2 is a conceptual diagram at a high level of main memory according to the preferred embodiment.

FIG. 2 is a conceptual diagram at a high level of main memory 102. Main memory is preferably a large random access memory which stores programs and other data for use by processor 101 and other components of system 100. Memory 102 includes base operating system 201, SAS server 210, a plurality of applications 220, and shared entities 230. Base operating system 201 is a multi-tasking computer operating system which provides basic operational functions for computer system 100, such as task initiation and termination, resource scheduling, page mapping and swapping, storage I/O, etc. Base operating system maintains numerous data structures for its varied functions, among them address to memory object table (AMOT) 202, page table 203, and memory object table 205, which are described more fully herein. It will be understood that base operating system 201 maintains many other data structures in addition, these not being critical to an understanding of applicants' embodiment. SAS server 210 also maintains various data structures, including active task list 211, cohort mapping table 212, cohort block indices 213, permanent directories 214, free space directories 215, and active block table 216. Applications 220 contain programming code or data used by particular tasks executing on system 100. Shared entities are programming code or data structures which have virtual addresses within a shared address space (SAS) region. Typically, these could be entities in an object-oriented programming environment, such as objects, classes, methods, etc. However, the use of the SAS region is not limited to object-oriented programming environments, and the region could also contain conventional files, programs and other data structures. The SAS region is described more fully below.

Although main memory is conceptually shown in FIG. 2 as a single entity in which significant programs and data are contained, it will be understood that in typical operation it is not possible to store all programs and data in main memory simultaneously. Portions of base operating system 201 and other components may be loaded into main memory, while other portions remain on auxiliary storage, such as disk drive storage. These portions may be swapped in or out depending on demand. Additionally, portions of programs or data may be contained in one or more high-speed caches for improved performance.

In the preferred embodiment, base operating system 201 is the Micro-Kernel Operating System available from the Open Software Foundation. However, it should be understood that other multi-tasking operating systems perform similar or analogous functions, and the present invention could be adapted to other multi-tasking operating systems by making minor modifications to the SAS facilities. Particularly, operating systems which support shared memory between different tasks and memory mapped files are appropriate, although the present invention is not necessarily limited in use to operating systems of that type. In reality, applicants experimented with a prototype using IBM's version of the Micro-Kernel Operating System, which is a slight modification of the Open Software Foundation's version. However, it is believed that none of the modifications made in the IBM version of the Micro-Kernel Operating System are relevant to the present invention.

It is expected that typically the operating system described herein would be distributed as an inherent part of a computer system and stored in the non-volatile storage (e.g. magnetic disk drives) of the computer system. However, because the operating system has few, if any, specific hardware dependencies, it would also be possible to distribute the operating system separately from hardware. Additionally, it would be possible to distribute a server portion of an operating system separately for use with an existing base operating system. In these cases, the operating system instructions which maintain data structures as exemplified by FIG. 2 and perform the functions described herein could be distributed on any computer readable medium, such as magnetic tape, removable magnetic disk, optical disk, etc. Appropriate data structures may be distributed in skeleton form on the computer readable medium, or may be created by the code upon execution.

System 100 may be part of a network of computer systems, each of which recognizes unique and persistent virtual addresses within a shared region. In this manner, entities can be shared among the various computer systems in the network. Alternatively, the computer system described herein need not necessarily be attached to a network of systems having similar characteristics, or to any network at all. It would be possible to utilize a shared address region as described herein on a single system, which does not share entities in a network environment.

Virtual Address Space

As noted above, the registers of CPU 101 define a virtual address space, which in the preferred embodiment is $2^{64}$ addressable bytes. Base operating system 201 in conjunction with SAS server 210 maps this address space for each executing task. A significant feature of the present invention is the form of this mapping, as explained below and shown in FIGS. 3–5. As used in FIGS. 3–5 and the accompanying explanatory text, an "entity" could be a code module, data structure, data space, etc. The term "entity" is used rather than "object", because "object" has specific meaning in certain contexts. However, an "entity" could also be an object. An "entity" could also be one or more "blocks", as that term is used below.

Figure 3:
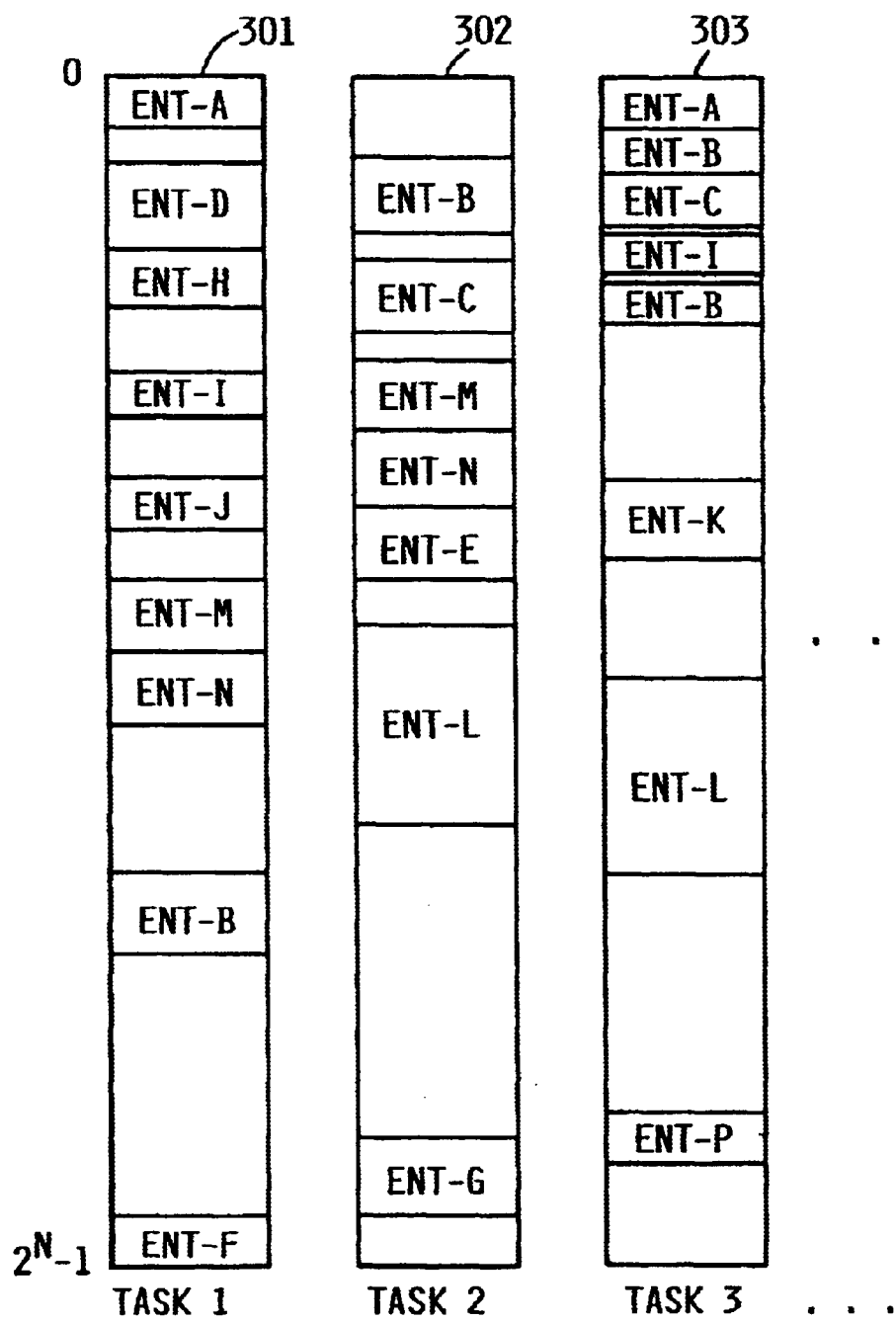
FIG. 3 is a high level depiction of the mapping of entities in virtual address space of a conventional multiple virtual address space operating system.

FIG. 3 depicts at a high level the mapping of entities in virtual address space of a multi-tasking computer system utilizing a conventional multiple virtual address space operating system of the prior art. A range of addresses from 0 to $2^n-1$ can be expressed in CPU registers holding n bits of information. For each task executing on the system, there exists a separate mapping 301–303 of entities to virtual addresses. While three task mappings 301–303 are shown in FIG. 3, it will be understood that this is for illustrative purposes only, and that typically a much larger number of tasks can be handled by the system. A table, list or other data structure contains the mapping information for a task. The mapping may be specified on a segment or block basis (i.e., each fixed-size range of addresses), or on an entity basis, or some other basis.

As shown in FIG. 3, each task can map the entire virtual address space of $2^n$ addressable units, and each task's map is different. Because each virtual addresses are duplicating in different virtual address spaces, the spaces are "overlapping". Some entities, such as A, C, and L, are mapped in the address space of more than one task, but are not necessarily at the same virtual address. Other entities, such as D and P, exist only within a single task. An entity, such as B, may be noncontiguously stored in the virtual address space of one task, and contiguously stored in the virtual address space of another.

Because the virtual address of a particular entity in the system of FIG. 3 may vary from task to task, there is no persistent virtual address associated with an entity. Typically, an arbitrary virtual address is assigned each time the entity is loaded or linked by the task from available virtual address space. Therefore, not only may the same entity have differing virtual addresses in different task address spaces, but the same entity may have differing virtual addresses in the address space of a single application for each instance of the application. If pointers are used to reference locations in different entities, these must be resolved to the current environment of the executing task. This typically introduces considerable complexity in the operation of the system, and can significantly affect performance. For example, pointers will be stored in some convertable form, address resolution data structures will exist, operating system code will manipulate the pointers to resolve the address to a particular environment, etc.

Figure 4:
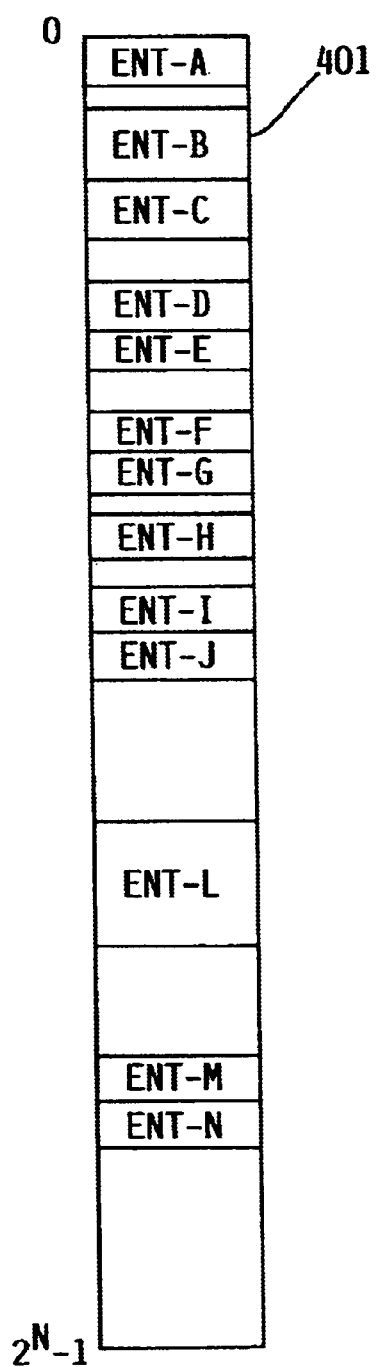
FIG. 4 is a high level depiction of the mapping of entities in virtual address space of a single-level store computer system.

FIG. 4 depicts a high level mapping of entities in virtual address space of a computer system utilizing a single-level store architecture. As shown in FIG. 4, there is but a single large virtual address space map 401, and all entities are mapped into this one space. Entities which are used only by one task, as well as entities which are used by more than one task, are all mapped in the same space. A consequence of this single large mapping is that each mappable entity has its own unique range of virtual addresses, which do not overlap or duplicate those of any other entity. As explained in the background section, this provides certain advantages when accessing entities which are used by different tasks. Since there is only one virtual address associated with an entity, this virtual address is persistent, and will be the same whenever the entity is referenced. This obviates the need to re-assign pointers in the virtual address space, and these pointers may be permanently assigned.

Typically, single-level store architectures are expected to have a sparse utilization of the virtual address space. When an entity is created, a chunk of virtual address space is permanently allocated to the entity, and therefore removed from use by other entities. The operating system will usually allocate virtual address space liberally, because it is not possible to reassign addresses later. Because all entities must share the same virtual address space in the system using single-level store architecture, and addresses are rapidly allocated without actually holding any data, the address space defined by n must be very large. While 16-, 24- and 32-bit addresses have been used with conventional multiple virtual address space architectures, a larger number is usually considered necessary for single-level store. The original IBM System/38 used 48-bit addresses, and more modem implementations envision 64-bit or larger addresses.

Figure 5:
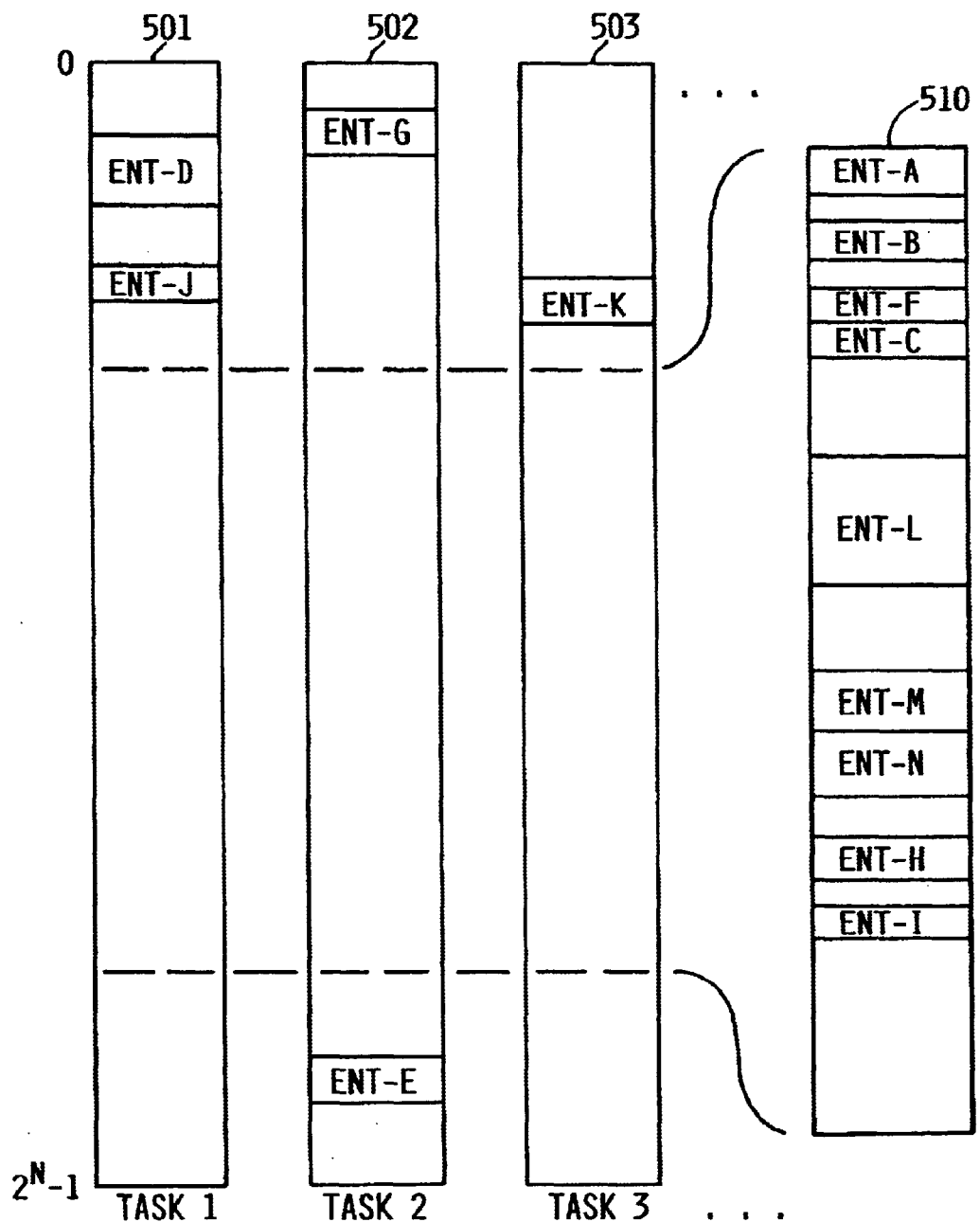
FIG. 5 is a high level depiction of the mapping of entities in virtual address space of a computer system according to the preferred embodiment of the preferred embodiment of the present invention.

FIG. 5 depicts a high level mapping of entities in virtual address space of a computer system utilizing a shared address space region architecture, according to the preferred embodiment of the present invention. As in the case of the conventional multiple virtual address space architecture of FIG. 3, each task has its own mapping 501–503 of entities to virtual address space. Unlike the conventional system, however, a large portion of the virtual address space, designated the shared address space (SAS) region 510, contains a single common mapping across multiple tasks.

The SAS region 510 has characteristics of a single-level store architecture. SAS server 210 enforces a mapping of entities within the SAS region, and assures that all entities within this region are uniquely and persistently mapped. This address range is unique within the SAS region. However, outside SAS region 510, the mapping of entities in virtual memory is handled in the same manner as a conventional multiple virtual address space architecture. As shown in FIG. 5, entities outside the SAS region are mapped differently for each of the different tasks.

It should be understood that although addresses within the SAS region are persistently assigned to entities, there are certain system global events which may cause a re-assignment of addresses, depending on the design of the operating system. For example, the system may be designed so that addresses are re-assigned in the event of a re-building of the system following disaster recovery, or following a major alteration of the system. On the other hand, the system may be designed so that addresses are never re-assigned under any circumstances, and are indeed permanent. As used herein, "persistent" assignment means that addresses are not re-assigned whenever a new task is initiated or an entity is loaded from auxiliary storage. The very purpose of the SAS region and persistent assignment is that the same virtual address can be used to reference the same entity time and again.

As with a single-level store architecture, it is expected that address space in SAS region 510 will be sparsely used, and a very large address space is therefore desirable. In the preferred embodiment, the top and bottom $2^{52}$ addresses in the processor's virtual address space lie outside the SAS region, and all addresses in the middle are in the SAS region. I.e., addresses 0 through $2^{52}-1$, and addresses $2^{64}-2^{52}$ through $2^{64}-1$, lie outside the SAS region, while addresses $2^{52}$ through $2^{64}-2^{52}-1$ are in the SAS region. In other words, approximately 99.95% of the virtual address space lies in the SAS region. But even with such a large proportion of virtual address space taken by the SAS region, the remaining virtual address space still contains $2^{53}$ addresses. This is larger than required by most, if not all, of the conventional multiple virtual address space architectures used today.

Because a sufficiently large range of addresses lies outside the SAS region, a multiple virtual address space operating system which has been modified as described herein can function in a normal manner without invoking the SAS facility. It can create multiple virtual address space mappings for multiple tasks, and within the address range lying outside the SAS region, each task can arbitrarily assign addresses to entities without regard to the mappings of other tasks. More significantly, computer programming code which was written and compiled for use on a conventional multiple virtual address space operating system will execute normally as a task in the system of the preferred embodiment, without the need to re-write or re-compile the code. Thus, a system having advantages of a single-level storage architecture is compatible with code written for a conventional multiple virtual address space system.

It should be understood that the mappings of FIGS. 3–5 are intended to illustrate the concepts of different address mapping approaches, and are not intended to show actual mappings for a particular system. In particular, the mappings are not drawn to scale. Typically, the number of mappable entities would be much larger, the size of an individual entity in relation to the total address space would be much smaller, and for larger values of n, the amount of unallocated space in a map would far exceed the amount of allocated space. As explained previously with regard to FIG. 5, SAS region 510 occupies a larger proportion of total address space than graphically depicted in the figure.

Addressing Constructs and Terminology

Figure 6:
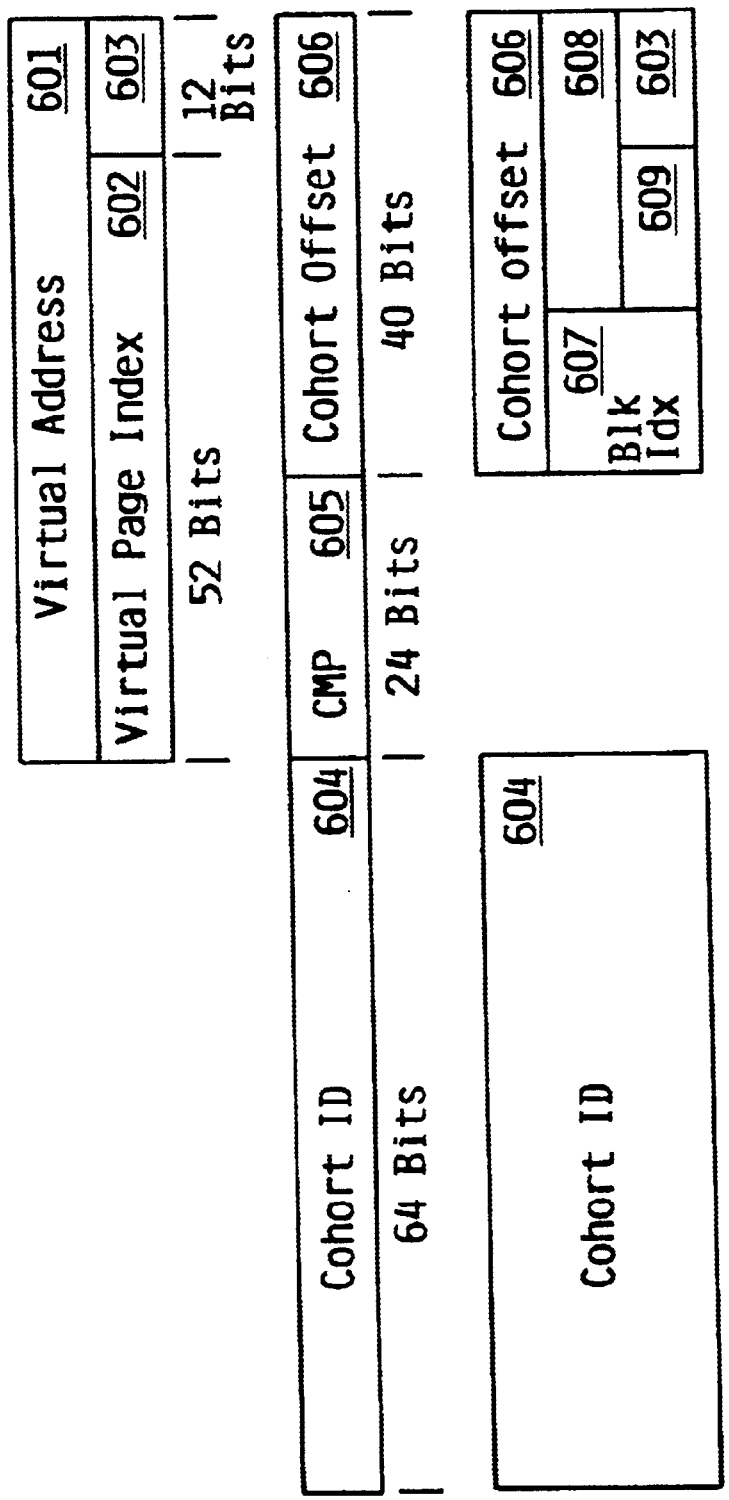
FIG. 6 illustrates certain addressing constructs according to the preferred embodiment.

In order to efficiently support addressing in SAS region 510 as described herein, and to further enable sharing of objects across different systems in a potentially large network of systems, certain addressing constructs are used in the preferred embodiment. These are illustrated in FIG. 6. It should be understood that the addressing constructs illustrated in FIG. 6 are shown here in order to describe applicants' preferred embodiment, and that many variations of address length and address constructs are possible.

In the preferred embodiment, memory is byte-addressable. A virtual address 601 contains 64 bits, that being a convenient number established by the length of hardware registers in CPU 101 and other hardware constraints. A page is a 4 Kbyte contiguous segment of memory, in which all address bits are the same except the lowest order 12 bits. Therefore virtual address 601 may be divided into 52-bit virtual page index 602 and 12-bit byte index 603. Virtual page index 602 is sufficient to specify any page within the 64-bit address space of CPU 101, while byte index 603 is sufficient to specify any byte within a 4 Kbyte page.

In the preferred embodiment, address space is assigned to storage devices in large chunks called cohorts. Each cohort contains $2^{40}$ (approximately one trillion) bytes of address space. A cohort is simply a convenient unit of assigning large portions of the address space, and is particularly useful in a distributed processing environment. Normally, a single cohort is assigned to a set of physical storage devices. If the set uses up all the virtual addresses in the cohort, additional cohorts may be assigned to the set.

In a distributed processing network, each cohort is uniquely identified by 64-bit cohort identifier 604. Within a cohort, any byte is uniquely identified by 40-bit cohort offset 606. Therefore, it is possible to uniquely identify any address in the network by the concatenation of the 64-bit cohort ID 604 and 40-bit cohort offset 606. This 104-bit identifier is also referred to as the object identifier.

It will be observed that the 104-bit object ID does not fit within the 64-bit address space of CPU 101. A 64-bit cohort ID is used in order to conveniently assure uniqueness of the cohort identifier throughout a potentially large network of systems. While 64 bits are potentially needed to identify all cohorts in a very large network, it is believed to be much larger than needed for identifying all cohorts on a single system. Within the processor address space of a single system, a cohort is identified by 24-bit cohort mapping prefix (CMP) 605. The concatenation of CMP 605 and cohort offset 606 form the 64-bit virtual address 601

The 64-bit space of cohort IDs is mapped into the 24-bit space of CMPs on any single system. A data structure in memory 102 contains the mapping, as described more fully below. This means that any single system can address only a small fraction of the possible number of cohort IDs in the entire distributed processing network. However, even this small fraction is extremely large, amounting to approximately 16 million cohorts. Moreover, 64 bits are provided for cohort identifier to conveniently assure uniqueness of the identifier in a distributed processing network. This does not mean that $2^{64}$ cohorts actually exist in physical storage. Generally, this range of identifiers will be very sparsely allocated. The large 64-bit range makes it possible to assign portions of the range to different nodes in the network on some predetermined basis, without requiring a global cohort allocater to allocate cohorts sequentially. On a single system, only cohorts which are actually assigned to some physical storage need be given a CMP, allowing CMPs 605 to be assigned sequentially or on some other basis which assures that addresses are not wasted. The 24-bit size of CMP 605 is deemed adequate for this purpose.

If system 100 is not intended to share data in a network environment, the 64-bit cohort ID is unnecessary, and cohorts can simply be identified locally by CMU 605. In this case, certain references to the cohort ID in data structures and procedures described below should be understood to refer to CMP 605.

Cohort ID 604, CMP 605 and cohort offset 606 together constitute a 128-bit object reference, i.e., all the addressing information relating to an addressable entity on the system. However, as explained above, this 128-bit object reference is not itself an address; it is larger than an address. CMP 605 is duplicative of cohort ID 604, and only one or the other is needed to specify a cohort within a system.

As explained above, a cohort is a unit of allocation for sets of storage devices. Within a cohort, address space is allocated for use by the operating system and application programs in blocks. The system of the preferred embodiment supports block allocations of different sizes although the block size must be a power of two, and must be at least a page (4 Kbyte) and no larger than a cohort. Typically, a block is much smaller that a cohort and much larger than a page. As illustrated in FIG. 6, within a cohort, a block is identified by block index 607, and a byte within a block is identified by block offset 608. Block offset 608 can be further subdivided into block page index 609 and byte index 603.

Data Structures

In the preferred embodiment, SAS server 210 maintains various data structures to support the functions of the SAS region. The key structures are active task list 211, cohort mapping table 212, cohort block index 213, permanent directory 214, free space directory 215, and active block table 216, it being understood that these are not necessarily the only data structures maintained by SAS server 210. Because SAS server 210 operates as a server responding to calls from base operating system 201, these data structures are transparent to the base operating system. The structure and function of these data structures is described more fully below.

Figure 7:
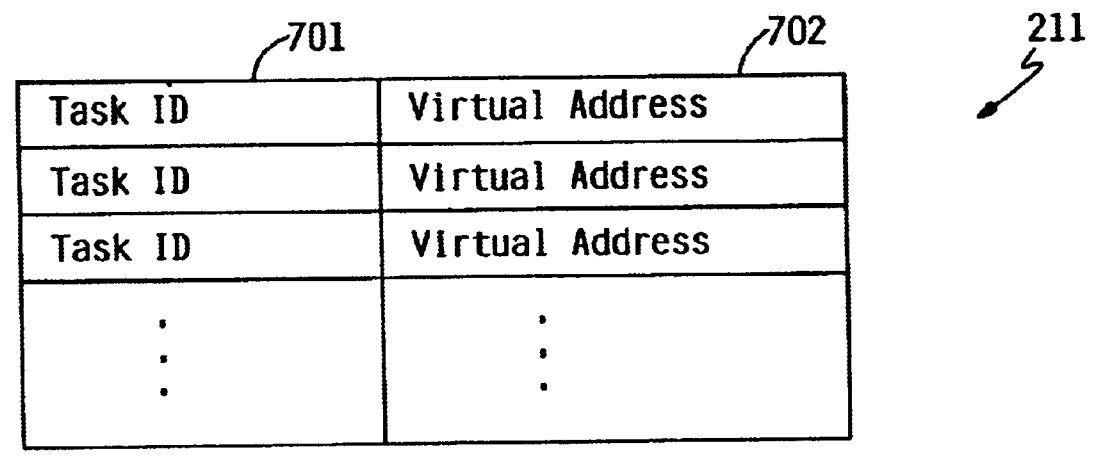

FIG. 7 depicts the format of active task list data structure 211. Active task list 211 contains a record of all active tasks which have joined the SAS region and the blocks which they have attached within the SAS region, i.e., the blocks for which access has already been requested and verified. Active task list 211 contains a plurality of entries, each entry representing either a pairing of a task with a block attached to that task or a pairing of a task with the SAS region, the latter entry being made when the task first joins the SAS region. If a block is attached to more than one task, its address may appear in multiple entries in active task list 211. Each entry contains task identifier field 701 for identifying the task, and virtual address range field 702 containing the starting virtual address and length of the block or SAS region.

The SAS server 210 maintains a single active task list 211, which contains information for all tasks and blocks.

FIG. 8 depicts the format of cohort mapping table data structure 212. Cohort mapping table 212 contains a mapping of the 64-bit cohort ID 604 into 24-bit CMPs 605 and identifies the set of storage devices to which the cohort is allocated. Cohort mapping table 212 contains a plurality of entries, each entry containing a cohort ID field 801, a cohort mapping prefix field 802, and a media ID field 803. Media ID field 803 contains an identifier for a set of physical storage devices. SAS server 210 maintains a single cohort mapping table 212 for system 100, containing a system-wide mapping of cohort ID to CMP.

FIG. 9 depicts the format of cohort block index data structure 213. Cohort block index 213 is a record of all blocks which have been allocated (created) within a set of storage devices (media group). Generally, a media group will have one cohort of virtual address space allotted for its use, but it may have more than one. Cohort block index contains a header portion containing the starting address of the next unallocated block 901, and a list of all physical storage devices which are in the media group 902. Following the header are a plurality of block entries, each representing an allocated block. Each block entry contains block address range field 903 and authority control field 904. Block address range field 903 contains the starting virtual address and length of a block which has been allocated within one of the cohorts assigned to the media group. Authority control field 904 contains a pointer to an authority control mechanism (such as an access control list) which controls authorization to the block.

As noted above, there is one cohort block index 213 for each media group, and therefore the system may have multiple cohort block index data structures, each one recording allocated blocks within its respective media group. Collectively, the cohort block index data structures contain a complete, permanent record of allocated blocks within the SAS region. It will be recalled that block allocations are persistent, and can not be duplicated by different tasks. The cohort block indices provide the record for assuring that blocks are never allocated more than once. For this reason, cohort block indices are persistent records which survive a system initial program load (IPL) or re-initialization.

FIG. 10 depicts the format of permanent directory data structure 214. Permanent directory 214 constitutes a mapping of virtual address space for which storage has actually been allocated to the physical storage. Permanent directory 214 contains a plurality of entries, each entry representing a contiguous range of virtual addresses which have been allocated a contiguous range of physical storage space. Permanent directory 214 contains virtual address field 1001 containing a starting virtual address for the range of addresses which have been allocated physical storage space, device identifier field 1002 containing the identifier of the physical storage device, sector field 1003 containing the starting sector of the allocated space on the physical storage device, and length field 1004 containing the length of the allocation of physical storage.

Like cohort block index 213, there is one permanent directory 214 for each media group. However, there is not a one-to-one correspondence of entries in the two data structures. When a block is allocated, the virtual address space within the block is reserved for some particular task, but the block does not necessarily contain any data. Typically, the size of the address space far exceeds the amount of physical storage. Address space is intended to be is sparsely used, so that most of the address space in an allocated block will never be allocated any physical storage.

FIG. 11 depicts the format of free space directory data structure 215. Free space directory 215 contains a record of all space on physical storage media which has not yet been allocated to any block. Like permanent directory 214 and cohort block index 213, there is one free space directory 215 for each media group. I.e., there is a one-to-one correspondence between cohort block index data structures 213, permanent directory data structures 214, and free space directory data structures 215. Free space directory contains a plurality of entries each representing a segment of free physical space on storage media. Each entry in free space directory 215 contains device identifier field 1101 containing the identifier of the physical storage device, sector field 1102 containing the starting sector of the free space on the physical storage device, and length field 1003 containing the length of the free physical storage.

FIG. 12 depicts the format of active block table data structure 216. Active block table 216 records currently active blocks, media and authority control. The information is active block table 216 is largely duplicated in other data structures such as cohort block index 213 and cohort mapping table 212, but the table is used for performance reasons, as explained later. SAS server 210 maintains a single active block table 216 for the system. Active block table 216 contains a plurality of entries, each entry representing an active block. Each entry in table 216 contains memory object identifier field 1201, virtual address range field 1202, cohort identifier field 1203, media identifier field 1204, authority control field 1205, and task count field 1206. Memory object identifier field 1201 contains a memory object identifier which is assigned to the active block by base operating system 201, and used for identifying the block in certain procedure calls between base operating system 201 and SAS server 210. Task count field 1206 contains a count of the number of currently active tasks which have attached the block; this field is used for removing table entries which are no longer being used. Virtual address range field 1202 cohort ID field 1203, media ID field 1204, and authority control field 1205 contain the same information which is contained in virtual address range field 903, cohort ID field 801, media ID field 803, and authority control field 904, respectively, of cohort mapping table 212 and cohort block index 213.

It will be appreciated that, with respect to the above described data structures, it is not necessary to store a complete virtual address and block length in fields 702, 903, 1001, and 1202. For example, since cohort block index 213 is used to identify blocks, it is sufficient to store that portion of the virtual address sufficient to identify a block. In addition, if block size is fixed, it is not necessary to store a block length. In the preferred embodiment, it is deemed better to store the entire virtual address and mask out unwanted bits, and to store the length in order to support blocks of various sizes. Although this requires a small amount of additional memory, it is easier to move entire addresses and gives the system greater flexibility. It will also be appreciated that the data structures may contain additional fields not critical to an understanding of the embodiment described herein.

In addition to the data structures described above, which are maintained by SAS server 210, there are several data structures which are maintained by base operating system 201, and which are significant to the operation of SAS server 210. Base operating system maintains address to memory object tables (AMOT) 202, page table 203, and memory object table 205. It should be understood that base operating system 201 further maintains a large number of other data structures which are not described herein, as is common in an operating system for a multi-tasking computer system.

AMOT 202 maps blocks in virtual memory to memory object identifiers, pagers, and block access rights. In base operating system 201, a "pager" is a software port for a page request, i.e., the identity of a service utility for handling a page request. By providing a mapping of blocks to pagers, it is possible to provide different facilities for handling page requests to different parts of memory. Specifically, in the case of SAS regions, a page request to a page in the SAS region will be routed to the pager identified in AMOT 202, which will be SAS Server 210. A page request to a page outside the SAS region will be routed to a default paging utility. AMOT also records for each block the access rights that the task has been given for that block, e.g., "read", "write" and "execute". AMOT 202 is also used to reserve ranges of virtual address space, effectively removing these ranges from free space available for allocation. AMOT is referenced by operating system 201 when allocating available free space. Base operating system 201 maintains a separate AMOT for each active task.

Page table 203 maps virtual page indices to page indices in real storage, i.e., it records where a page actually is in real storage. Conceptually, the page table can be visualized as pairs of virtual page indices and real page indices, there being a separate set of pairs for each task on the system. In reality, the table may have a different, more complex structure, for reasons of performance or memory size. The actual structure of the table is not critical to an understanding of the preferred embodiment.

Memory object table 205 records which virtual pages are in real storage on a global basis (i.e., unlike the mapping in page table 203, which is on a task basis). Memory object table 205 is used to map a page in real storage being used by one task to another task in page table 203, thus avoiding the need to duplicate the page in real storage.

Operation

Figure 13:
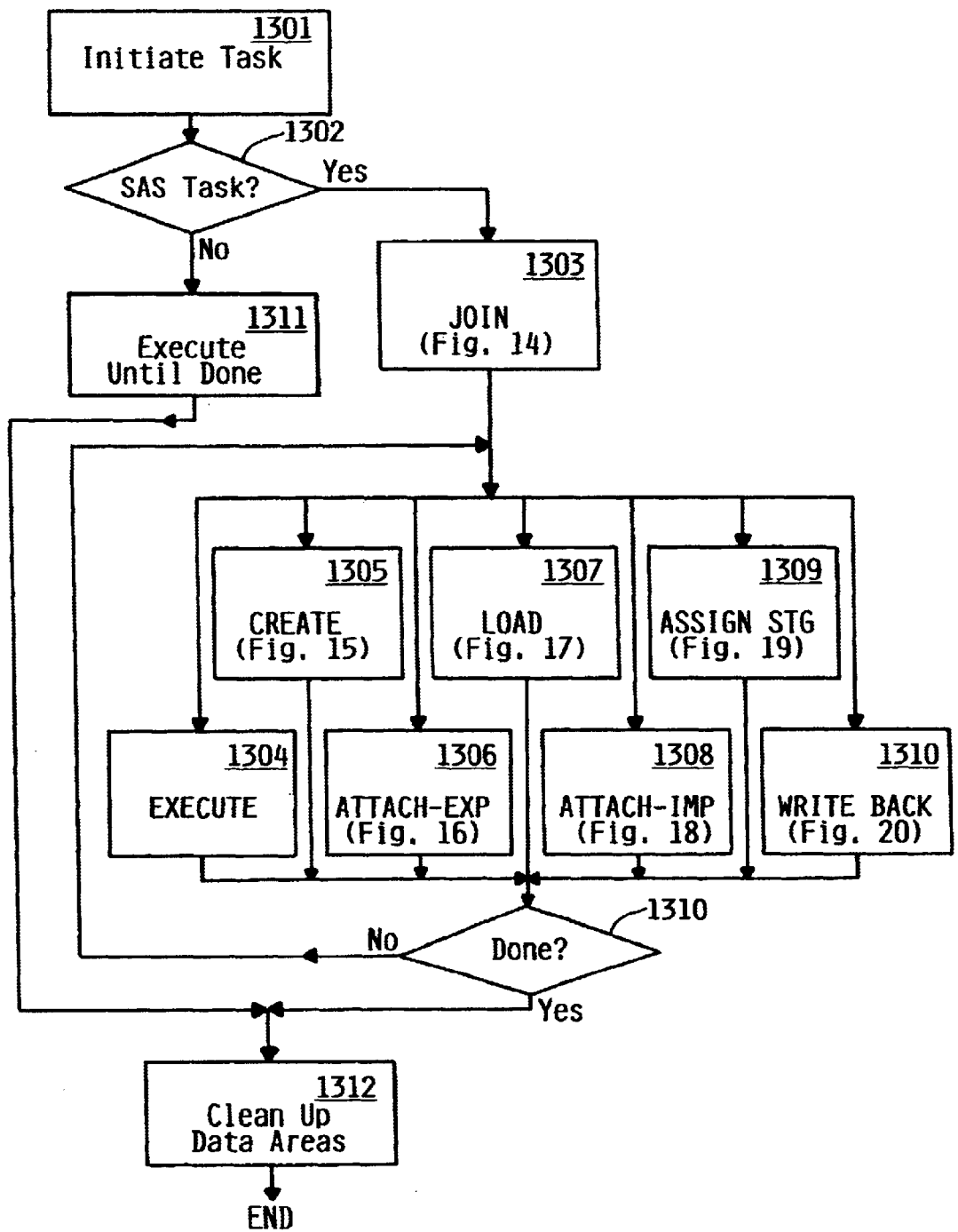
FIG. 13 shows a high-level flow diagram of task execution on the system, according to the preferred embodiment.

In operation, SAS Server 210 offers a battery of facilities that are invoked as necessary to make the system behave in accordance with the shared address space model. FIG. 13 shows a high-level flow diagram of task execution on the system of the preferred embodiment. In this embodiment, each task has the option to join or not to join the SAS region. As shown in FIG. 13, the key facilities available to support the SAS region are Join 1303, Create 1305, Attach Explicit 1306, Load 1307, Attach Implicit 1308, Assign Physical Storage 1309 and Write Back 1310.

A task is initiated in a conventional manner upon the request of a user by base operating system 201 as represented by block 1301. Base operating system creates all the data structures and table entries normally required to support execution of the task in the multi-tasking system. In particular, base operating system creates an AMOT 202 and entries in page table 203.

If the task is to join the SAS region and take advantage of its facilities, it must contain an explicit call to join the SAS region. It is not absolutely necessary that this call be made before any execution of the task takes place, but it would normally be done as one of the earliest commands issued by the task, and the decision to join the SAS region 1302 is therefore shown in FIG. 13 immediately following task initialization 1301. In applicants' embodiment, block 1302 is not a "decision" in the classical sense of a comparison of data, but is simply the presence or absence in the executing task of a call to join the SAS region.

If the task does not join the SAS region, execution proceeds in the conventional manner until completed, as represented by block 1311. In this case, no special allocation is made regarding virtual address space in the range otherwise reserved for the SAS region. Accordingly, the task is free to use any of this virtual address space for any purpose that would normally be permitted under conventional operating system constraints. Because base operating system 201 maintains a separate virtual address map for each task on the system, the use by a task which has not joined the SAS region of a virtual address range within the region will not affect the use by other tasks of that same virtual address range. Thus the system can concurrently execute tasks which have joined the SAS region and tasks which have not.

If a task is to join the SAS region, it initiates a call to the SAS server's join facility. This call is only made once for each task which joins the SAS region. The join call has the effect of reserving virtual address space in the SAS region and directing certain address references within the region to SAS server 210.

Figure 14:
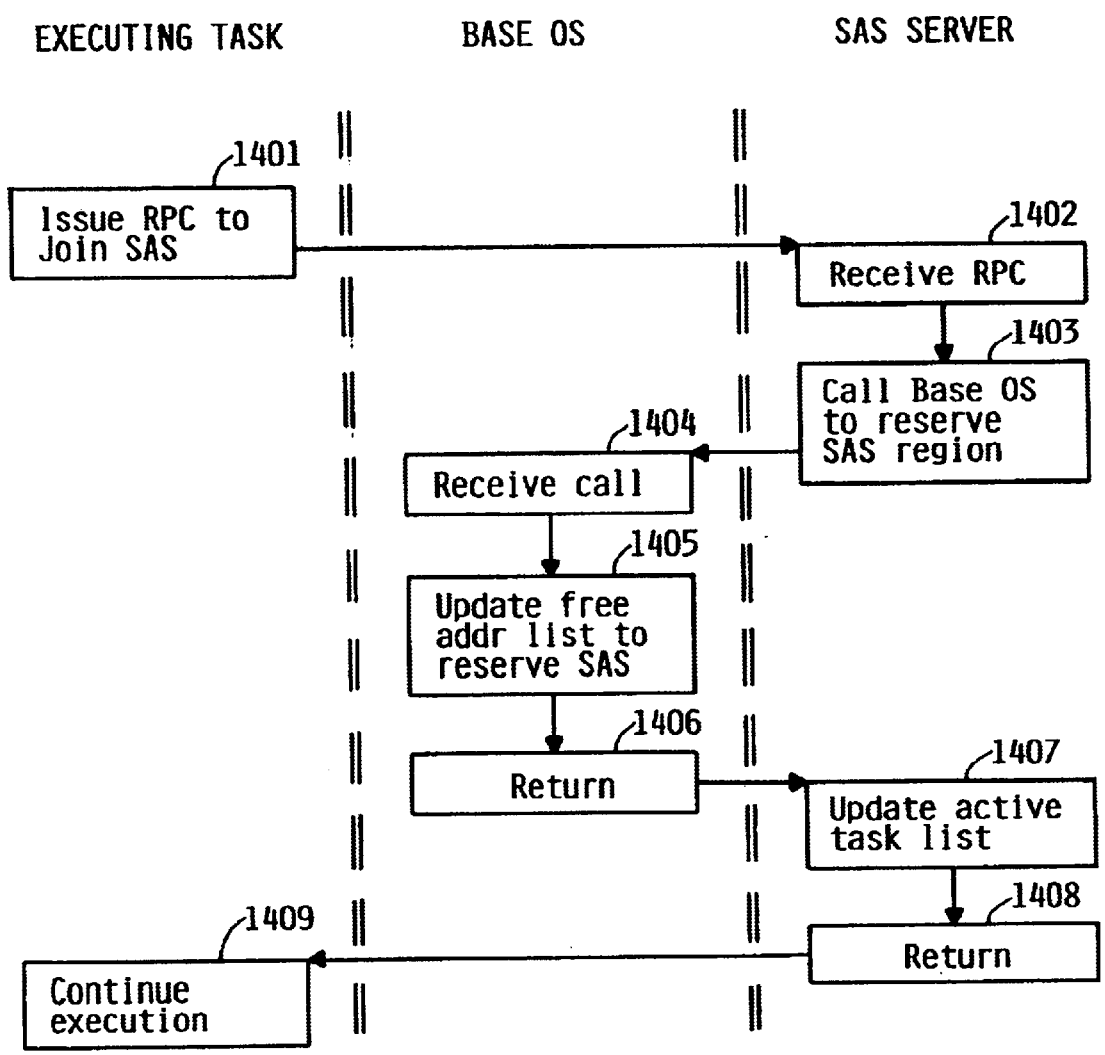
FIG. 14 illustrates in greater detail the steps taken by the system when a task joins the SAS region, according to the preferred embodiment.

FIG. 14 illustrates in greater detail the steps taken by the system when a join call is made. At step 1401, the executing task asks to join the SAS region by issuing a remote procedure call to SAS server 210. SAS server receives the call 1402. SAS server 210 then issues a call back to base operating system 201 to reserve the SAS region for its use. Base operating system receives this call 1404, and reserves the entire SAS region of virtual address space. The reservation of space in the virtual memory map means only that the address space can not be used by the base operating system to satisfy a request for free space; it does not prevent memory accesses to addresses within the SAS region. Base operating system 201 satisfies a request for free space by parsing the entries in AMOT 202 to determine which address ranges have not been allocated. Therefore, the SAS region is reserved by adding an entry to AMOT 202 covering the entire SAS region, effectively preventing the operating system from allocating free space from the SAS region. Base operating system then returns to the SAS server at 1406. Upon returning to the SAS server, the server updates active task list 211 by adding an entry for the task which initially called the SAS server requesting to join the SAS region, at step 1407. The entry contains the identifier of the task in task ID field 701 and the address of the SAS region in virtual address field 702. SAS server 210 then returns at step 1408 to the task which initially called it, and the task resumes execution at 1409.

Having joined the SAS region, the task may invoke any of the SAS server's facilities or may continue execution, as represented in FIG. 13. Generally, the SAS server's facilities may be invoked multiple times and in varying order, as represented by blocks 1304–1310. Conventional execution of the task is represented by block 1304. Typically, the task will execute in a conventional manner until it either explicitly or implicitly requires one of the SAS server's facilities, which is then called (blocks 1305–1310). Upon return the task continues execution. The process repeats until the task completes. Upon completion; base operating system 201 and.SAS server 210 perform certain clean-up functions (block 1312), described more fully below.

The task may create entities having addresses within the SAS region for use by itself and/or other tasks. In order to do this, an address range within the SAS region is assigned to a block using the Create call 1305. Upon creation, a block is like an empty container of virtual memory; it is the unit of allocation and access control within the SAS region. Having created the block and specified access rights to it, the task which created it (or other tasks) will then determine what to place within the block, e.g., text data, object code, database, etc. SAS server 210 only provides the mechanism for block allocation, attachment, etc., and,does not control what is placed in the block by a task which is authorized to access it.

Figure 15:
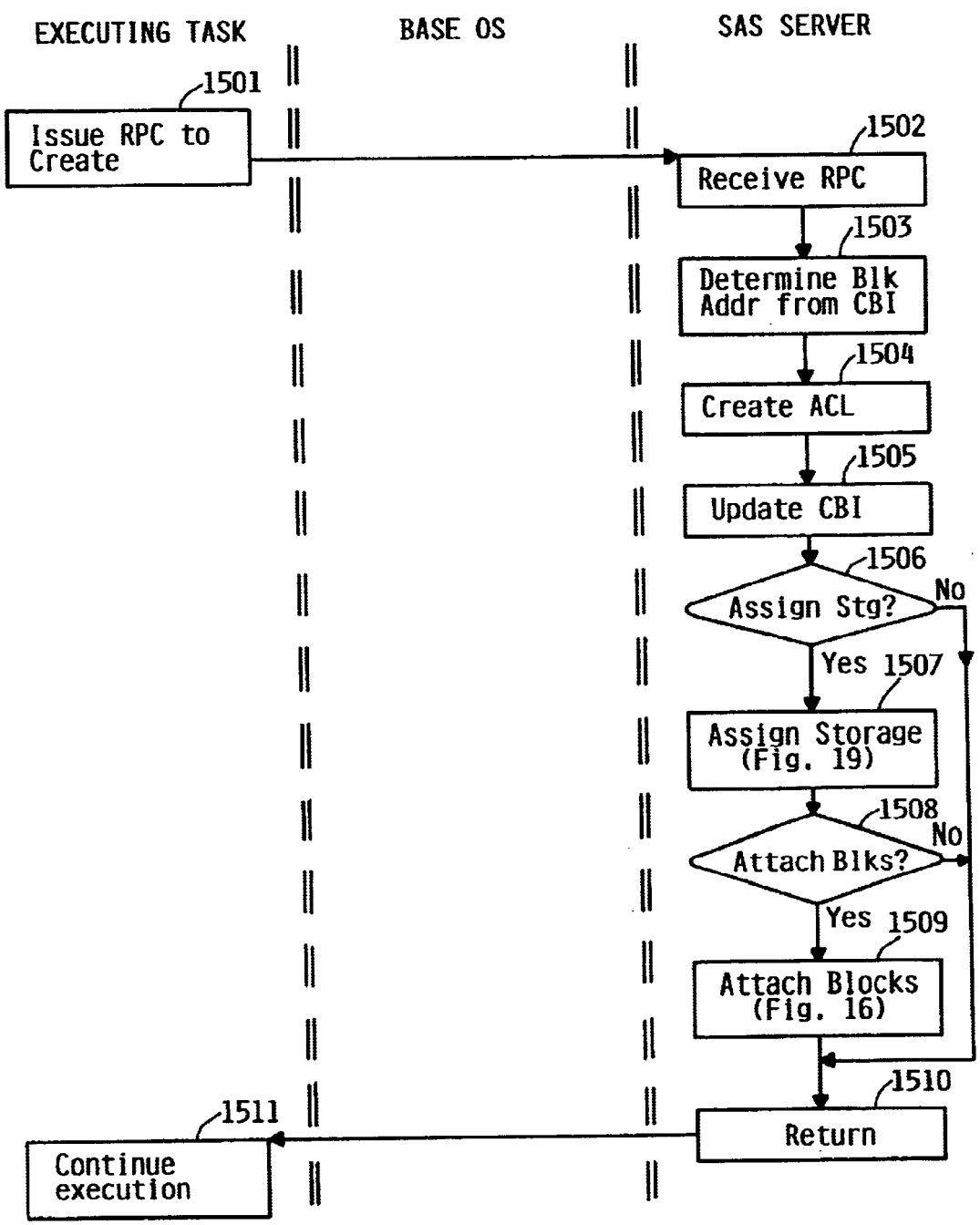
FIG. 15 illustrates in greater detail the steps taken by the system when a block within the SAS region is created, according to the preferred embodiment.

FIG. 15 illustrates in greater detail the steps taken by the system when a create call is made to SAS server 210. A task creates a block by issuing a remote procedure call to SAS server 210 at step 1501, requesting the SAS server to create a block. With the create call, the task passes a cohort identifier, identifying cohort in which the block will be created, and a length identifying the block size. Block size is a power of two, is at least one page, and no larger than a cohort. SAS server 210 receives the call at step 1502. SAS server then refers cohort mapping table 212 to determine the media group (and hence the cohort block index data structure 213) associated with the cohort specified in the create call, and then to the cohort block index 213 to determine the location of the next available unallocated address for the block, at step 1503. This address will be the address in next block field 901.

SAS server 210 creates an appropriate authority control structure for the block to be created at step 1504. In the preferred embodiment, the authority control structure is an access control list. Specifically, it is a list of users who are authorized to access the block (in some implementations, the access control list is a list of tasks authorized to access the block). The access control list will also identify an "owner", i.e., someone authorized to change the authority to access the block. If no access control list is specified in the create call, SAS server 210 creates a default access control list. As a default, the user on whose behalf the calling task is running is identified as the owner of the block. No other individual authority is granted to access the block, but read only access is granted globally to all users. The calling task, or another task executing on behalf of the same user, may later change this access control list using any utility which may be available on the system for this purpose. Because the cohort block index 213 contains a pointer to the authority control structure in field 904, it is possible for more than one block to reference the same authority control structure. It will be understood by those skilled in the art that alternative (or no) authority control mechanisms may be used, and that SAS server 210 may alternatively call some system security utility provided in base operating system 201 or elsewhere to create an appropriate authority control mechanism.

SAS server 210 then updates cohort block index 213 at step 1505 to reflect the newly created block. A new entry is created in index 213, having the starting address and length of the new block in virtual address range field 903 and a pointer to the authority control structure in field 904. Next block field 901 is advanced to the address immediately after the highest address within the newly created block, this to be the address assigned to the any subsequently created block. Thus, blocks are allocated from the SAS region's address space sequentially, although it will be understood that alternative allocation schemes could also be used. Because cohort block index 213 is the master record of block allocations, and these allocations must not be duplicated, cohort block index 213 is saved to non-volatile storage after each update.

Figure 19:
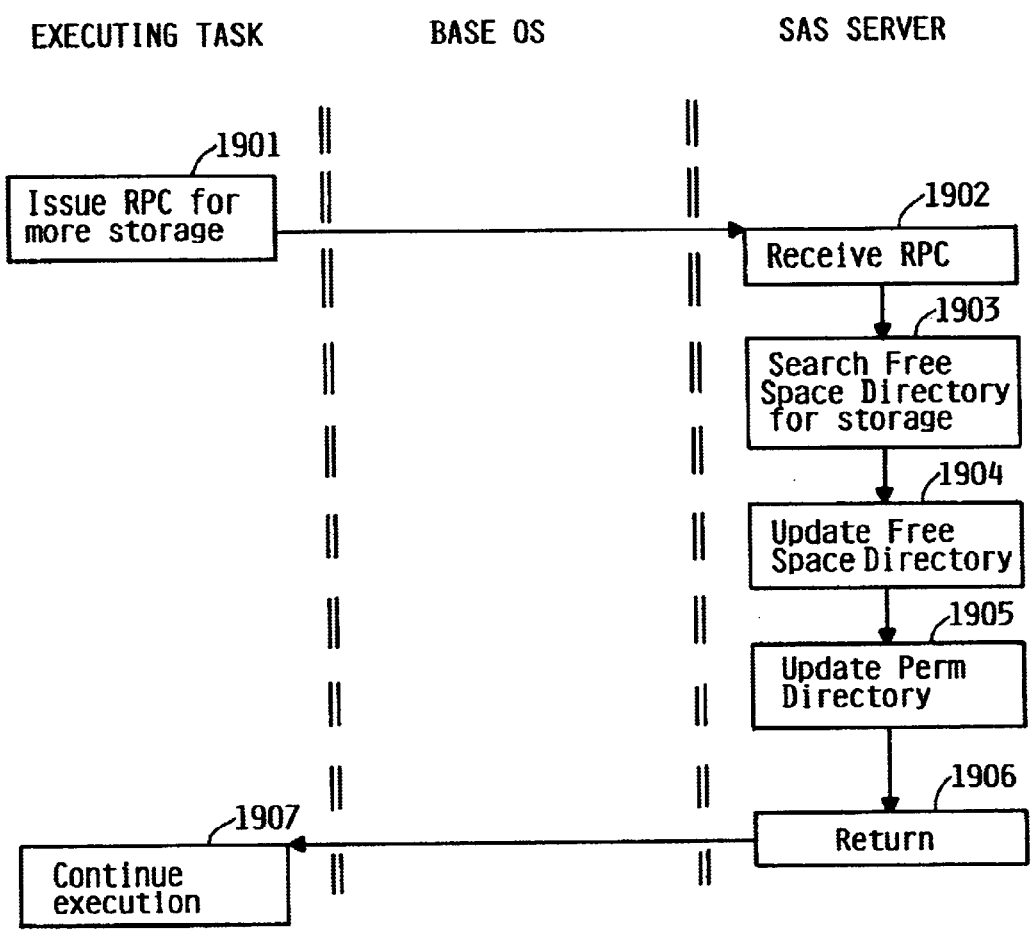
FIG. 19 illustrates the steps taken by the system when physical storage is assigned to blocks within the SAS region, according to the preferred embodiment.

At this point, SAS server 210 may optionally return to the calling task, or may continue by assigning physical storage, as depicted at step 1506. If the server continues, it calls an assign storage subroutine at step 1507 to assign physical space on storage media, which in the preferred embodiment will typically be magnetic disk drive media. The steps taken by SAS server in the assign storage subroutine are illustrated in FIG. 19 as steps 1903–1905. Basically, server 210 searches free space directory 215 for a sufficiently large range of unassigned physical storage at step 1903; updates the free space directory at step 1904 to reflect that the storage range to be assigned is no longer available as free space; and adds a new entry for the newly assigned physical storage to permanent directory 214 at step 1905. These steps are described more fully below with respect to FIG. 19.

After allocating physical storage, the server may optionally immediately attach the block to the calling task by invoking the explicit attach function, as illustrated in steps 1508, 1509. If the explicit attach function is invoked, it is called internally by SAS server 210. This amounts to performing the applicable steps shown in FIG. 16 and described in the accompanying text below. SAS server 210 then returns to the calling task at step 1510, which continues execution at step 1511.

The task may "attach" a block within the SAS region after that block has been created. Attachment is the mechanism by which the task is authorized to access the block. A task which has joined the SAS region may attach any block which it is authorized to access (regardless of which task created the block in the first instance). A task may attach any number of blocks within the SAS region, and a block may be attached by multiple tasks simultaneously, thus enabling shared access to objects in the SAS region. A particular block is attached to a particular task only once; after a task has attached a particular block, it need not attach it again although it may access it multiple times. Attachment is performed either explicitly or implicitly. An explicit attachment is one which is performed as a result of a direct call of the explicit attach function from the task. An implicit attachment is performed when the task attempts to access a block within the SAS region to which it has not previously been attached.

Figure 16A:
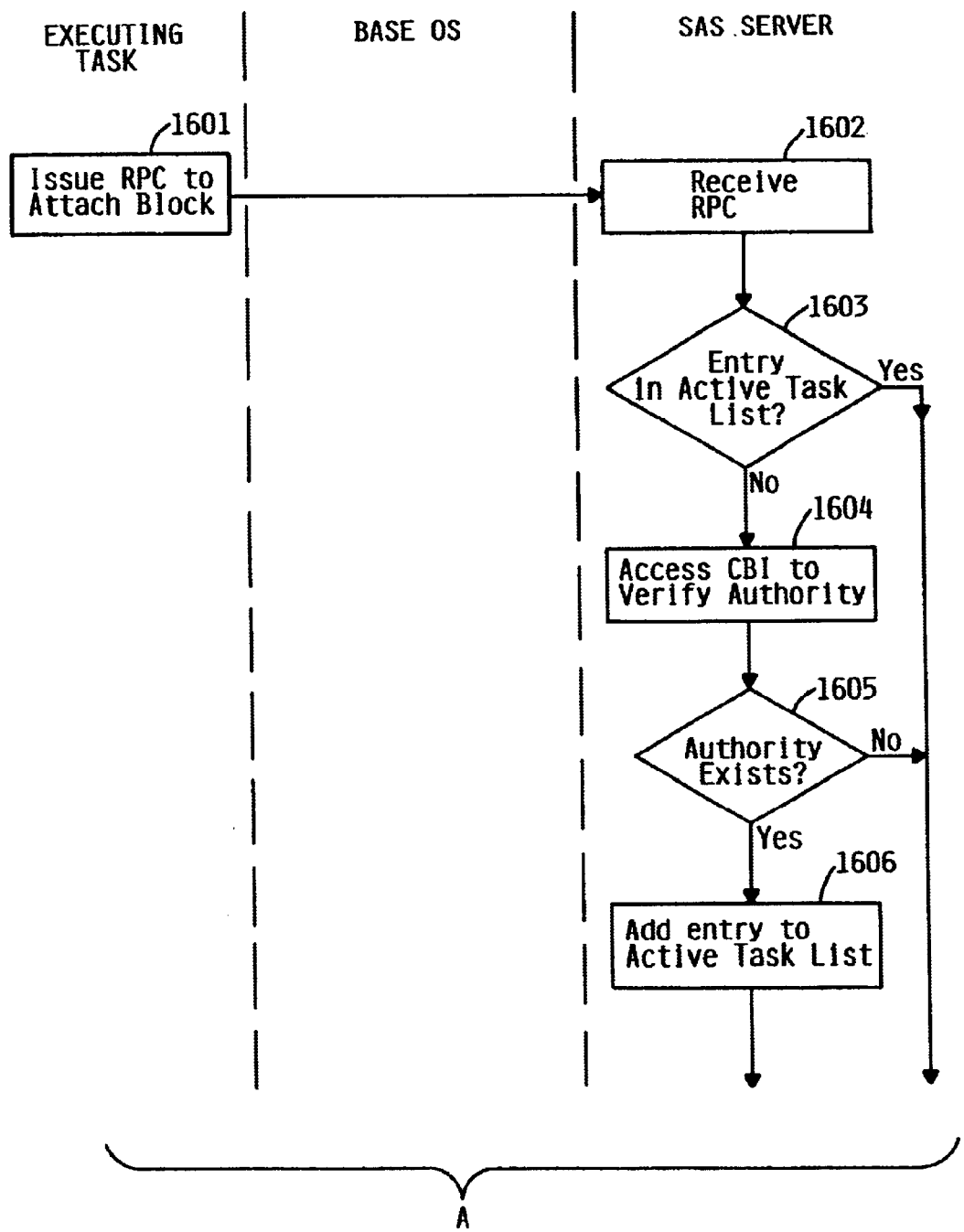
FIG. 16 illustrates in greater detail the steps taken by the system when an call is made to explicitly attach a block within the SAS region, according to the preferred embodiment.
Figure 16B:
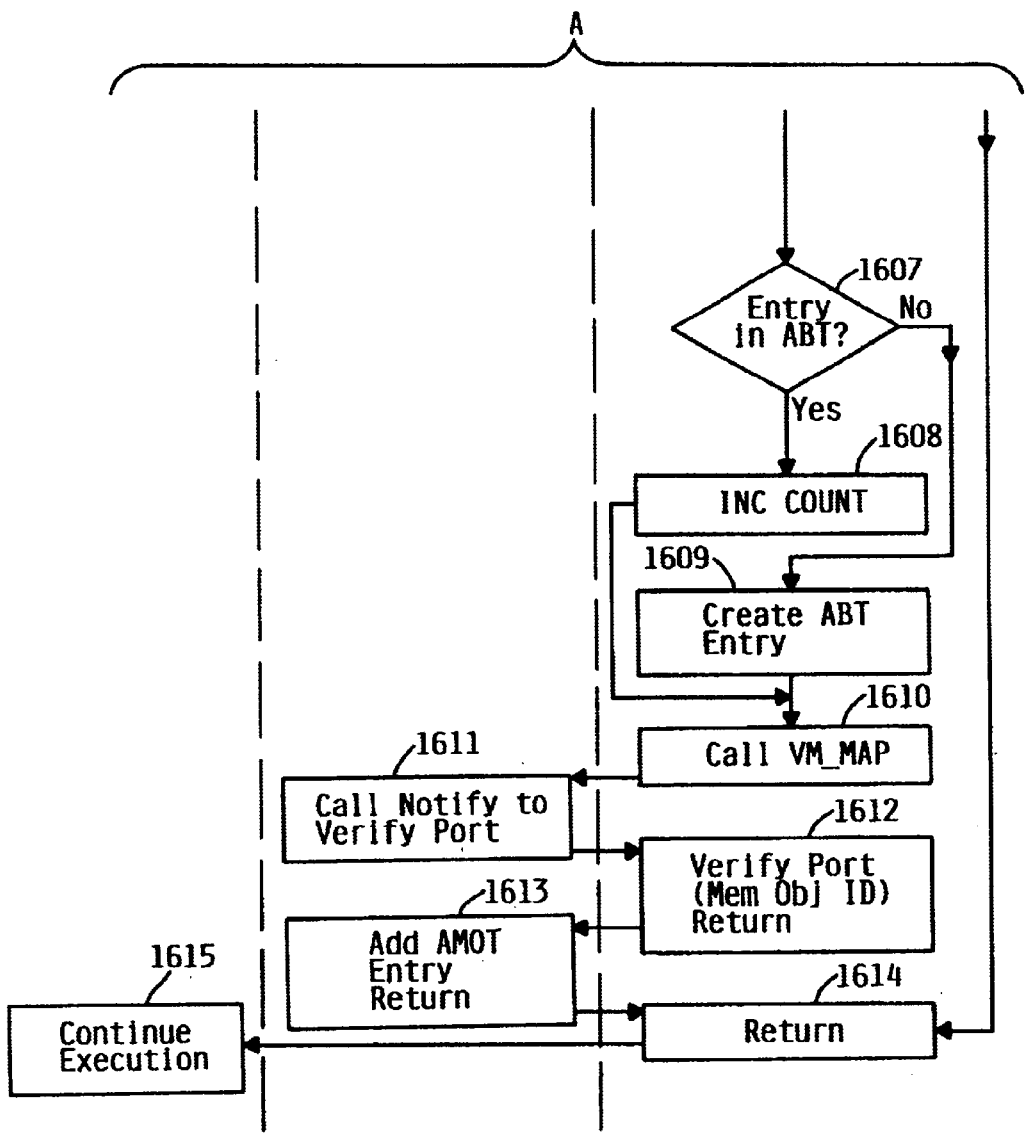

FIG. 16 illustrates in greater detail the steps taken by the system when an explicit attach call is made to SAS server 210. A task initiates the explicit attach function by issuing a remote procedure call to SAS server 210 at step 1601, requesting the SAS server to attach a block. The block starting address and type of access requested (e.g., read only, read/write, etc.) are passed parameters of the remote procedure call. SAS server 210 receives the call at step 1602.

Server 210 then checks active task list 211 for an entry corresponding to the executing task and block requested at step 1603. A corresponding entry in active task list 211 means that the block has already been attached, and need not be attached again; in this case, the server returns immediately to the calling task.

If no entry for the task and block exists in active task list 211, server 210 then accesses cohort block index 213 to find the applicable authority control structure, and verifies that the requesting task has authority to access the block at step 1604. In the preferred embodiment, server 210 parses an access control list identified by a pointer in authority control field 904 to determine whether authority exists. However, it will be recognized that many different and more complex authority verification schemes are possible, and verification of authority may be accomplished by calling a separate authority verification utility for that purpose. If insufficient authority exists (step 1605), server 210 returns immediately to the calling task without attaching any block.

If the requested authority exists, and no entry for the block and task exists in active task list 211, an entry is added to active task list 211 at step 1606. Server 210 then checks active block table 216 to determine whether an entry corresponding to the block to be attached already exists in the table at step 1607. An entry may exist in table 216, notwithstanding the fact that there was no entry for the executing task and block in active task list 211, because another active task may have previously attached the block.

If an entry for the block already exists in active block table 216, task count field 1206 of the corresponding entry is incremented at step 1608. Incrementing the count field indicates that another task has attached the block. Server 210 then issues a virtual memory Map call to base operating system 201 at step 1610 (see below).

If, at step 1607, an entry for the block does not exist in active block table 216, the above procedure is slightly modified. SAS Server 210 creates an entry for the block in active block table 216, specifying a block count of one in field 1206, and specifying the appropriate values of fields 1202–1265, at step 1611. Server 210 also generates a memory object identifier for the new block, which is placed in field 1201 of the newly created entry in active block table 216.

Server 210 then issues a virtual memory map call to base operating system 201 at step 1610. The VM map call requests base operating system 201 to update the virtual memory map applicable to the executing task so that the block to be attached is now included in AMOT 202. In the map call, server 210 specifies the memory object ID (from field 1201 of table 216), block virtual address range, pager (which is the SAS server) and type of authority.

Upon receipt of the VM map call, base operating system 201 is acting as a server which has no way of knowing whether the pager specified in the call will respond for the memory object ID. It therefore issues a "notify" call back to the specified pager (i.e., SAS server 210) at step 1611, requesting Server 210 to verify that it will respond for the memory object ID. On receipt of the notify call, a separate thread running on SAS server 210 accesses active block table 216, verifies that the specified memory object ID is in the table, and returns with a positive result at step 1612. Base operating system, 201 then adds the appropriate entry for the newly attached block to AMOT 202 of the executing task at step 1613, and returns to SAS server 210. SAS Server then returns to the executing task at step 1615, which continues execution at step 1616.

Having attached a block, the task is free to reference virtual memory locations within the block. These references are handled with the assistance of base operating system's page fault handling capabilities, and are essentially transparent to the executing task. Base operating system 201 maintains a page table 203 which maps virtual pages to real storage for each executing task, as explained previously. A virtual page in the SAS region is added to the page table using the SAS server's external page facility as part of a load procedure or an implicit attach procedure, both of which are explained below. The authority of the task to access the virtual page is verified before the page entry can be added to table 203, so that it is not necessary to verify authority to access any page that is already mapped in page table 203 for a particular task.

Figure 17:
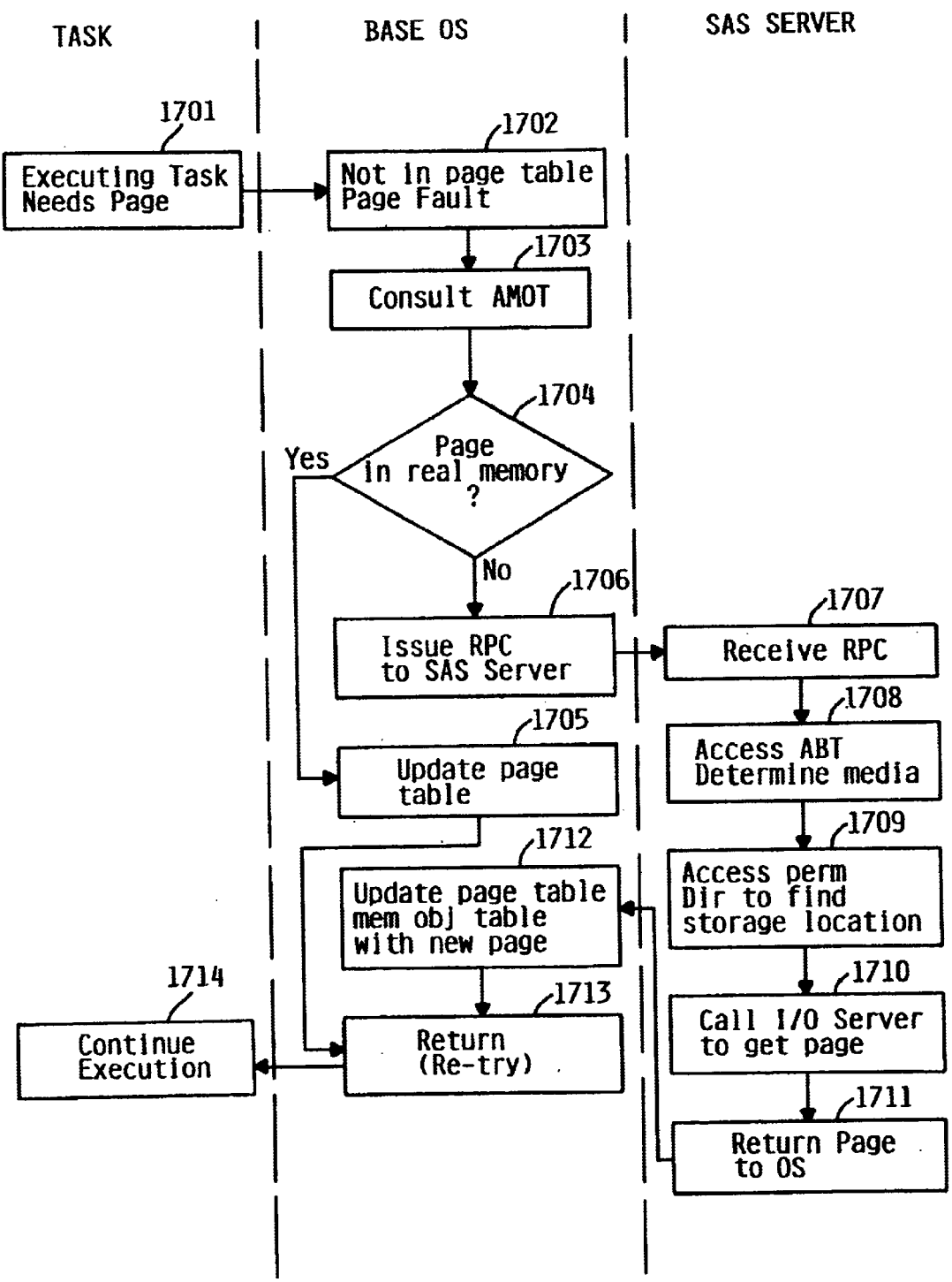
FIG. 17 illustrates in greater detail the steps taken by the system when an attempt to reference a page from a previously attached block in the SAS region generates a page fault, according to the preferred embodiment.

FIG. 17 illustrates in greater detail the steps taken by the system when an attempt to reference a page from a previously attached block generates a page fault, which may require that the page be loaded from storage to real memory ("Load procedure"). At step 1701, the executing task requires access to a page in virtual memory. At step 1702, the system looks in page table 203 and is unable to find an entry mapping the virtual memory address to real storage (a page fault condition exists).

Base operating system 201 then consults address to memory object table (AMOT) 202 in order to determine the memory object ID and appropriate pager port at step 1703. If the block was previously attached, an entry for the block will exist in AMOT. If no entry for the block exists, or if inadequate authority exists, an exception is generated (see below with respect to FIG. 18). Assuming no exception is generated, base operating system 201 uses memory object ID from AMOT 202 to search memory object table 205, in order to determine whether the requested page already exists in real memory (i.e., has been read into real memory on behalf of some other task) at step 1704. If the page already exists in real memory, base operating system 201 simply updates page table 203 so that the page is mapped to the appropriate real memory location in the page table entries for the executing task at step 1705. Base operating system then directs the task to re-try the instruction at step 1713 (see below). If the page does not exist in real memory, a pager is called.

In the base operating system of the preferred embodiment, it is possible to specify different software ports for handling page faults to different virtual memory locations. A default pager is provided with the base operating system, but different pagers may be specified. The software port is specified in a pager field in the AMOT entry corresponding to the block to be accessed. It should be understood that other operating systems could use other mechanisms. For a block in the SAS region, the pager specified in the pager field will be the SAS server's external pager. Accordingly, base operating system 201 issues a remote procedure call (in effect a page request) to SAS server 210 at step 1706, passing the memory object ID (from AMOT 202), block index 607 and block page index 609.

SAS server 210 receives the call at step 1707. Server 210 uses the memory object ID as an index to access the appropriate entry in active block table 216. Because the block has already been attached, an entry for the block should exist in active block table 216(if not, an exception is generated). SAS server 210 determines the correct permanent directory 214 from media ID field 1204 in ABT 216 at step 1708. Server 210 then accesses the appropriate permanent directory to find the storage device and sector corresponding to the virtual address sought at step 1709 (if no entry exists in permanent directory 214, an exception is generated). SAS server 210 requests an I/O server to fetch the appropriate page from the designated storage device and sector at step 1710, and returns this page to base operating system 201 at step 1711. Base operating system 201 updates page table 203 and memory object table 205 with entries mapping the virtual address of the page to its real storage location at step 1712. Base operating system then directs the executing task to re-try the instruction at step 1713, as it normally would following any page fault after the desired page has been loaded into memory. Upon re-try by the executing task, the page will be found in page table 203 and the instruction will execute at step 1714. It will be noted that while the page remains in real storage, subsequent memory references to the same page will be mapped directly by base operating system 201 using page table 203, making further calls to SAS server 210 unnecessary. If the page is "paged out" of real storage, it will be necessary to perform the load function again.

In some circumstances, an executing task may attempt to access an address in the SAS region virtual memory which it has not yet attached. For example, this may occur because the task is following a chain of pointers during execution of an object-oriented application, where different objects of the application are controlled by different users. Because it is difficult for the task to predict which blocks will be necessary for execution beforehand, it is desirable to have a mechanism which allows the executing task to simply attempt access with any pointer, and which automatically attaches the required block where appropriate. In the preferred embodiment, this is accomplished with the implicit attach function.

Figure 18A:
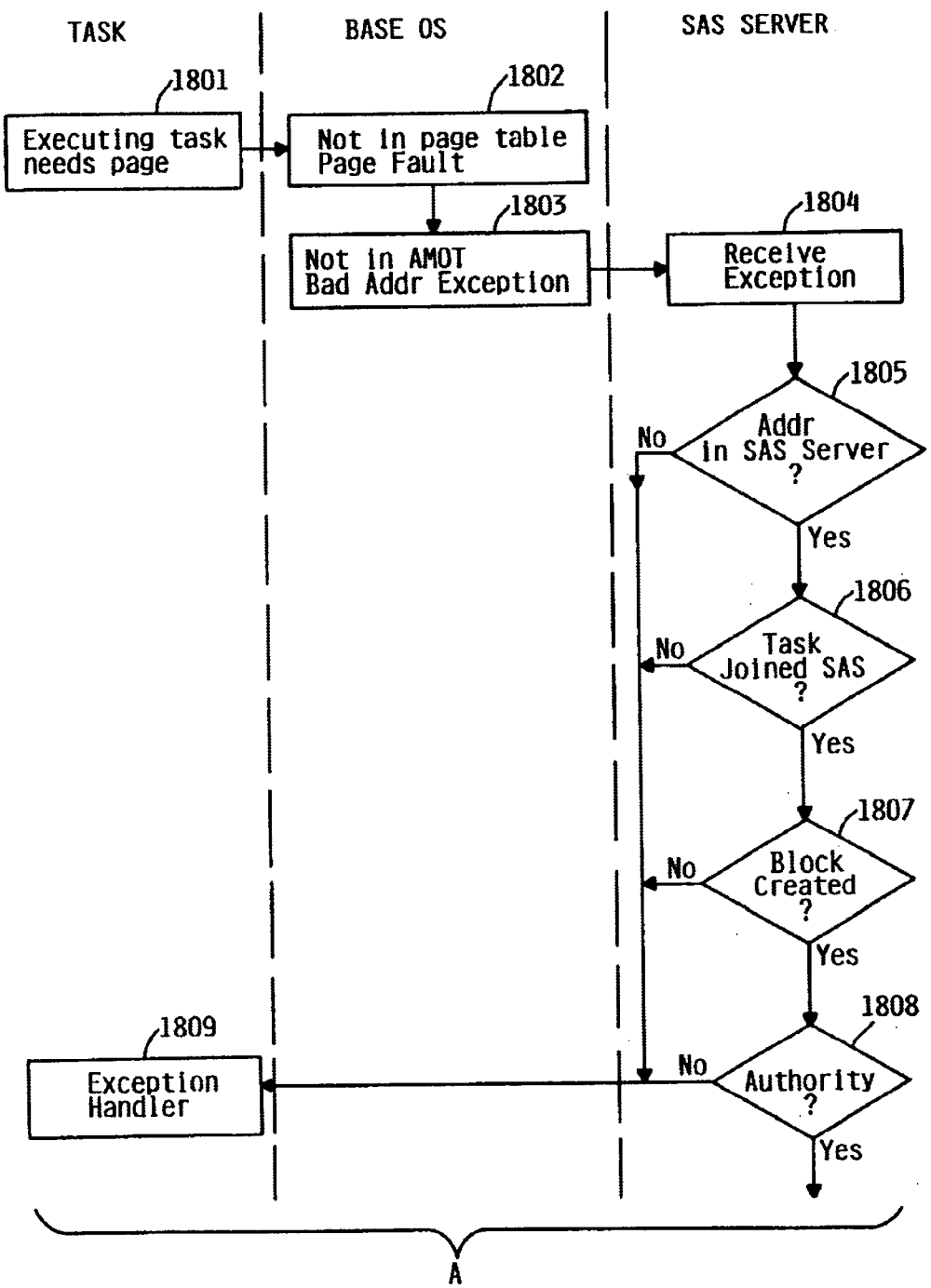
FIG. 18 illustrates in greater detail the steps, taken by the system when an attempt to reference a page from an unattached block in the SAS region generates a page fault, according to the preferred embodiment.
Figure 18B:
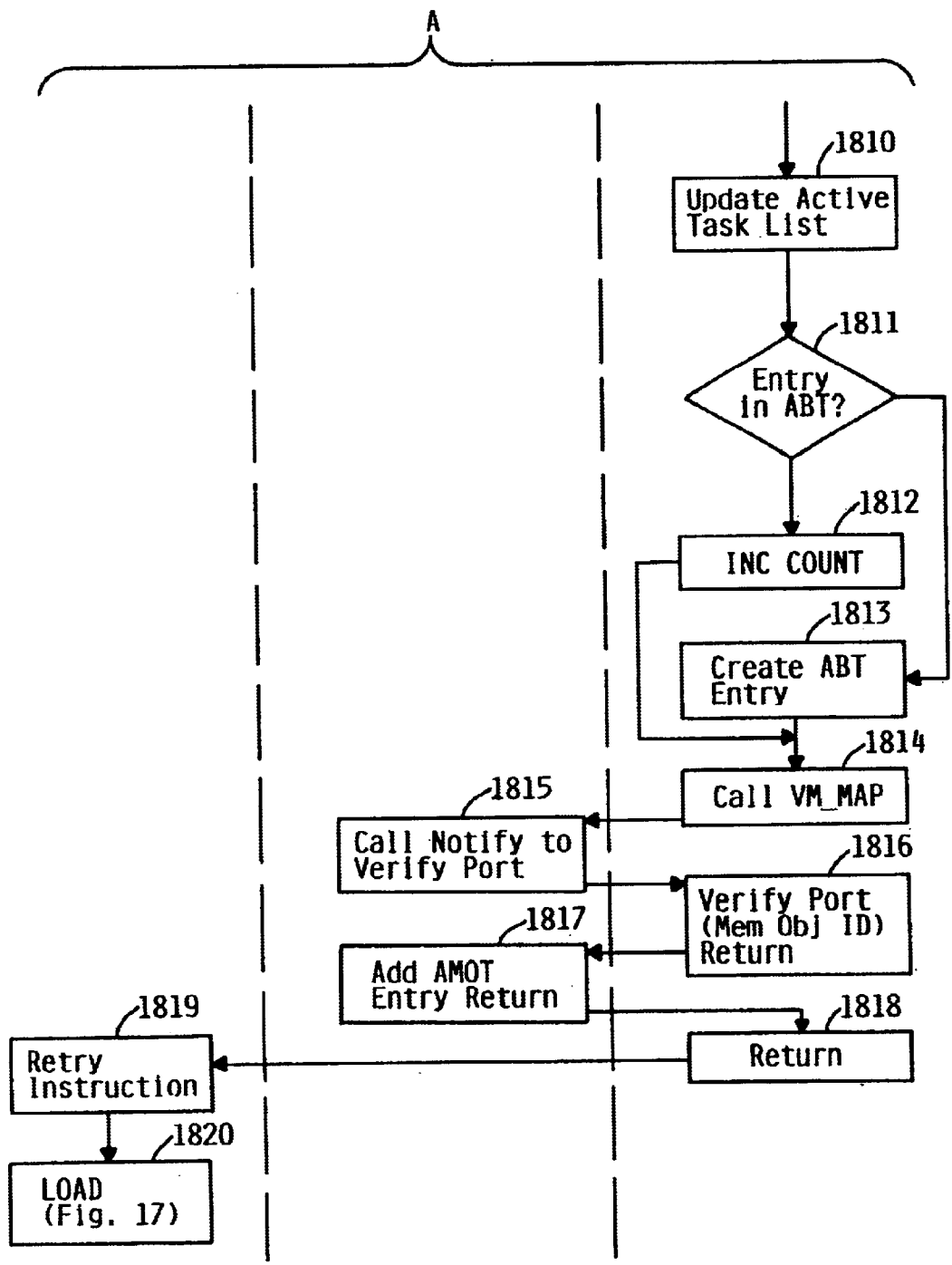

FIG. 18 illustrates in greater detail the steps taken by the system when an attempt to reference a page from an unattached block generates a page fault. The initial steps are similar to those shown in FIG. 17 and described above with respect to the load procedure. At step 1801, the executing task requires access to a page in virtual memory. At step 1802, base operating system 201 looks in page table 203 and is unable to find an entry mapping the virtual memory address to real storage (a page fault condition exists). Base operating system 201 then consults AMOT 202 to determine the proper pager port at step 1803. Because in this instance the block is unattached, there is no entry in the AMOT, and base operating system 201 generates a bad address exception.

The base operating system 201 of the preferred embodiment has the capability to alter the designation of exception ports. In this embodiment, all bad address exceptions are directed to SAS server 210. At step 1804, SAS server 210 receives the bad address exception. Server 210 then determines at steps 1805–1808 whether it should correct the exception condition or re-route the exception back to the default exception handler.

SAS server 210 first verifies whether the virtual address which generated the exception is within the SAS region at step 1805. If not, the exception is returned to the default exception port of base operating system 201 to be handled as a normal bad address exception at step 1809. SAS Server then accesses active task list to verify that the executing task has joined the SAS region at step 1806; if not, the exception is returned to the default exception port at step 1809. Server 210 then checks cohort block index 213 to verify that the requested block has been created at step 1807; if not, the exception is returned at step 1809. Finally, server 210 uses authority control field 904 to verify authority of the executing task to access the block at step 1808. As previously stated, in the preferred embodiment, field 904 is a pointer to an access control list, which is used to verify authority. If insufficient authority exists, the exception is returned at step 1809. It will be noted that by this method, an invalid address is treated in the same manner as a valid address to which the executing task lacks authority. For purposes of task execution, this is considered acceptable. In either case, the net effect is that task will be unable to access the address.

If the address is within the SAS region, the task has joined the SAS region, the block exists and authority to access the block exists, SAS server 210 will "implicitly" attach the block so that the task can access it. SAS server 210 adds an entry to active task list 211 corresponding to the executing task and block to be attached, at step 1810. The procedure followed at this point is similar to that used for an "explicit attach", particularly, steps 1607 through 1614, described above. SAS server 210 checks active block table 216 for the existence of an entry corresponding to the block to be accessed at step 1811. Even though the block has not yet been attached by the executing task, an entry may exist in table 216 because some other task has previously attached the block.

If an entry for the block already exists in active block table 216, task count field 1206 of the corresponding entry is incremented at step 1812. If, at step 1811, an entry for the block does not exist in active block table 216, server 210 creates an entry for the block in active block table 216, specifying a block count of one in field 1206, and specifying the appropriate values of fields 1202–1205, at step 1813. Server 210 also generates a memory object identifier for the new block, which is placed in field 1201 of the newly created entry in active block table 216.

Server 210 then issues a virtual memory map call to base operating system 201 at step 1814. The VM map call requests base operating system 201 to update the virtual memory map applicable to the executing task so that the block to be attached is now included in AMOT 202. In the VM map call, server 210 specifies the memory object ID (from field 1201 of table 216), block virtual address range, pager (which is the SAS server) and type of authority.

Upon receipt of the VM map call, base operating system 201 is acting as a server which has no way of knowing whether the pager specified in the call will respond for the memory object ID. It therefore issues a "notify" call back to the specified pager (i.e., SAS server 210) at step 1815, requesting Server 210 to verify that it will respond for the memory object ID. On receipt of the notify call, a separate thread running on SAS server 210 accesses active block table 216, verifies that the specified memory object ID is in the table, and returns with a positive result at step 1816. Base operating system 201 then adds the appropriate entry for the newly attached block to AMOT 202 of the executing task at step 1817, and returns to SAS server 210. SAS Server then returns to the executing task at step 1818.

Upon return, the executing task retries the instruction at step 1819. Again, base operating system checks the page table for the existence of the page (which will not be there). However, in this instance there will be an entry in AMOT 202. Therefore, the system performs the "load" procedure described above and shown in FIG. 17, represented as step 1820. Upon return from the "load" procedure, the instruction must be retried again. This time the instruction will be able to access the desired memory location, the page now being in memory and mapped in page table 203. As described above, if the page is "paged out" of real storage, it will be necessary to perform the load function again. However, it will not be necessary to attach the block again.

Sometimes, a task which has attached a block may need to assign additional physical storage within the block. It will be recalled that a block is like a large container of virtual address space, which is typically sparsely used. Physical storage will normally be allocated on a more conservative basis, because it represents actual hardware capacity. As objects within a block are created or expanded, additional physical storage may be necessary. FIG. 19 illustrates the steps taken by the system when additional physical storage is assigned to blocks within the SAS region. The executing task calls SAS server 210 at step 1901, requesting the server to assign additional physical storage. The amount of physical storage requested is a passed parameter. Server 210 receives the request at step 1902, and searches free space directory 215 for a sufficiently large range of unassigned physical storage, taking the first entry it finds in the free space directory of sufficient size, at step 1903. If no single contiguous range sufficiently large exists, server 210 will take multiple smaller non-contiguous ranges. At step 1904, the free space directory is updated to reflect that the range of storage to be assigned is no longer available as free space. At step 1905, a new entry is added to permanent directory 214 with the information of the newly assigned space. If multiple non-contiguous areas of storage are needed, a separate entry in permanent directory 214 is needed for each such area. The server then returns to the executing procedure at step 1906, which continues execution at step 1907. In the preferred embodiment, the system will not automatically assign physical storage if the executing task references an address within an attached block for which no storage has been assigned; the task must explicitly call the server, requesting it to assign storage. The requirement of an explicit call to assign storage is a design decision intended to the reduce the effect of erroneous references to unassigned addresses. It would alternatively be possible to assign storage automatically.

Figure 20:
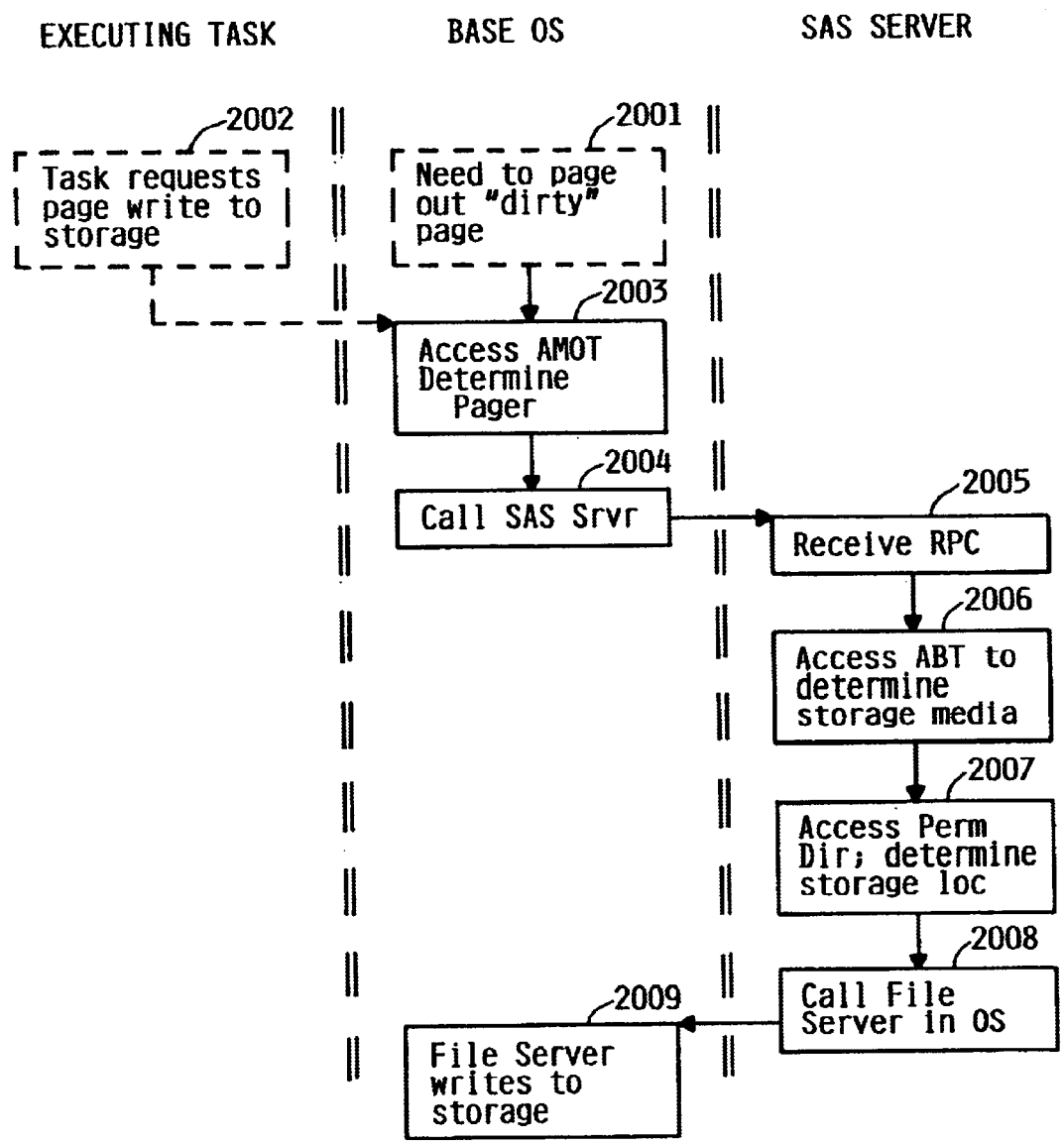
FIG. 20 illustrates the steps taken by the system when a page within the SAS region is written back to storage, according to the preferred embodiment.

FIG. 20 illustrates the steps taken by the system when a page within the SAS region is written back to storage. This process may be initiated by base operating system 201 because a "dirty" page (i.e., a page which has been altered since it was loaded) is being paged out (step 2001), or may be initiated by an explicit command from the executing task (step 2002). At step 2003, base operating system accesses AMOT 202 to determine the appropriate pager for the memory object of which the page to be written back is a part. For a page within the SAS region, the pager will be SAS server 210. At step 2004, base operating system 201 issues a call to SAS server 210, requesting that the page be written to storage. SAS server 210 receives the call at step 2005. Server 210 accesses active block table 216 to determine the appropriate media group at step 2006, and then accesses the permanent directory of the corresponding media group to determine the storage device and sector where the page should be written, at step 2007. SAS server then calls the base operating system's file server to write the page to storage, passing the device, media, and page location, at step 2008. The file server is a general purpose I/0 handler which is used by base operating system and SAS server to write data to storage locations. The file server returns control to base operating system 201 when finished writing the page to storage at step 2009.

When a task completes execution, base operating system 201 performs conventional clean-up functions with respect to data structures that it maintains, particularly AMOT 202, page table 203, free address list 204, and memory object table 205. Additionally, SAS server is called to clean up its data areas. In particular, SAS server 210 parses active task list 211 to determine whether the task has joined the SAS region. If so, for each task/block pair entry in active task list 211, the SAS server decrements count field 1206 in active block table 216. If the count is zero after decrementing, no active task is any longer attached to the block. Accordingly, the corresponding entry is removed from table 216. Lastly, all the entries for the task are removed from active task list 211. Cohort mapping table 212, cohort block index 213, permanent directory 214, and free space directory 215 are not affected by task termination. These functions are represented in FIG. 13 as step 1312.

A further refinement is employed to support execution of application programs compiled from certain languages which use static storage areas for temporary storage, such as C and C++. Typically, such code contains pointers to static storage locations. The code itself is read-only and doesn't change, but each executing task will need a separate copy of the static storage. If the program is intended to be a shared entity having a virtual address in the SAS region (and the static storage area likewise has a virtual address in the SAS region), some provision is necessary to allow different tasks to have different copies of the static storage area.

In applicant's embodiment, such static storage is allocated to a different block within the SAS region than the block containing the actual code. When the block containing static storage is first attached by an executing task and an entry is created in active block table 216, a field (not shown) in table 216 identifies the block as a "copy-on-write" block. Thereafter, when a virtual memory map call is made by server 210 (step 1610 or step 1814), the call also identifies the block as a "copy-on-write" block, and this information is placed in a field (not shown) in AMOT 202. If the executing task subsequently alters any data in the static storage, base operating system 201 creates a separate copy of the static storage in real memory, and alters the pager designation in the corresponding entry in AMOT 202 to specify the operating system's default pager. If a page in the static storage must be paged out to a temporary area of disk storage, it can be retrieved intact. The task is thus free to alter its copy of the static storage, and the copy remains at the same virtual address within the SAS region, without compromising the corresponding static storage areas of other tasks. In this limited sense, it is possible for different versions of an entity in the SAS region to exist in applicants' preferred embodiment.

Examples of Alternative Embodiments

In the preferred embodiment, a conventional multi-tasking operating system is used as a "base", and additional functions are added to it in order to support use of the SAS region, as described above. The use of a conventional multi-tasking operating system as a base greatly reduces the amount of development effort required for a new system, and facilitates compatibility with an existing operating system. However, the fact that the functions which support the SAS region in the preferred embodiment are external to the base operating system should not be taken as a design requirement. It would alternatively be possible to design and construct an operating system from scratch, in which the SAS functions are fully integrated into the operating system. There may be advantages to the alternative of a fully integrated operating system which would make it desirable, particularly where compatibility with preexisting software is not a concern.

It will also be understood that, where a SAS server is used to enhance the capabilities of a base operating system as in the preferred embodiment, the functions performed by the SAS server may depend on the capabilities of the base operating system, and the SAS server will not necessarily perform every function performed by the SAS server of the preferred embodiment, or perform every such function in exactly the same way.

It will be further understood that many alternative data structures may be used to support a shared address space among multiple virtual address spaces. A set of data structures has been described with respect to the preferred embodiment, and particularly with respect to a system having a base operating system and a server supporting the SAS region. The description of these particular data structures should not be construed to mean that alternative data structures are not possible, that all of the functions performed by the described data structures are essential for every embodiment, or that other functions might not be necessary, depending on the embodiment.

In the preferred embodiment, a task is not required to "join" the SAS region, and so may choose not to utilize the capabilities of that region. By not joining the SAS region, the full amount of virtual address space is available to the task for whatever use it may make of it. This embodiment enables the system to be fully compatible with a base system having no SAS region capability, since it is possible that certain applications will make use of addresses in the range of the SAS region for purposes other than access to the SAS region facilities. However, since it is anticipated that the total size of the virtual address space available to a task in the system is much larger than it needs, it is unlikely to be unduly constraining if a portion of that space is always reserved for the SAS region. Therefore, in an alternative embodiment, all tasks are required to reserve a fixed range of virtual address space for the SAS region, whether they use this facility or not. Depending on the implementation, this alternative may simplify some of the code required to manage the SAS region.

In the preferred embodiment, there is a single SAS region which consumes the bulk of the virtual address space, and which all participating tasks join. It would alternatively be possible to construct a system with multiple SAS regions for sharing among groups of tasks. As a general rule, the use of multiple SAS regions would appear to contravene the purpose of the shared address space, i.e., the ability to more easily share objects among different tasks. However, there may be situations in which it is desirable for purposes of security or other reasons.

In the preferred embodiment, an access control list is associated with each block and controls access to it. However, many alternative methods of access control are possible. It will be noted that the use of SAS regions already provide a form of access control, i.e., entities within the SAS region have one type of control mechanism, while entities outside the SAS region have different control. It would, for example, be possible to have no authority control within the SAS region, so that any task which has joined the region has authority to access any block within the region. Because each task has a portion of virtual address space outside the SAS region, any entities which the task wishes to protect from use by other tasks can be placed in its private virtual address space outside the SAS region. This alternative embodiment would simplify some of the functions described above. It would also be possible to use other forms of access control within the SAS region, such as domain attributes (described in U.S. Pat. No. 5,280,614, to Munroe et al., herein incorporated by reference) hierarchical rings, or task or user profiles. For example, a task or user profile might contain a list of blocks or other entities to which a task or user is authorized, and these might be automatically attached upon joining the SAS region, or attached on demand for access to a particular block by searching the list. SAS regions provide an addressing and access mechanism which is generally compatible with a wide range of authority control methods.

Although a specific embodiment of the invention has been disclosed along with certain alternatives, it will be recognized by those skilled in the art that additional variations in form and detail may be made within the scope of the following claims.

What is claimed is:

1. A computer system, comprising:
   a processor;
   a memory;
   an operating system for supporting concurrent execution of a plurality of tasks on said computer system, said operating system comprising a plurality of instructions executable on said processor, said plurality of instructions maintaining a plurality of data structures supporting operating system functions performed by said plurality of instructions executing on said processor;
   wherein said operating system allocates a plurality of overlapping task virtual address spaces, each task virtual address space being allocated to a respective task;
   wherein said operating system allocates, within a plurality of said task virtual address spaces, a shared address space region, said shared address space region occupying the same virtual address range within each respective task virtual address space, said shared address space region being less than the entire task virtual address space; and
   wherein said operating system allocates, within said virtual address range occupied by said shared address space region, a plurality address ranges assigned to respective addressable entities, each respective one of said range of addresses being uniquely and persistently assigned to its respective addressable entity, and wherein the virtual address range of an addressable entity shared by two or more tasks resides at the same address within each task's shared address space region.

2. The computer system of claim 1, wherein said processor defines a processor address space, and wherein each respective task virtual address space includes the full range of addresses in the processor address space.

3. The computer system of claim 1, wherein said operating system selectively allocates, with respect to each task, said shared address space region within the virtual address space of the respective task, said data structures including at least one data structure which records whether said shared address space region has been allocated within the virtual address space of a task.

4. The computer system of claim 1, wherein said operating system comprises:
   a base operating system portion, said base operating system portion including instructions supporting concurrent execution of a plurality of tasks and concurrent allocation of a plurality of overlapping task virtual address spaces; and a shared address space server portion, said shared address space server portion including instructions supporting said shared address space region, said shared address space server portion responding to calls from said base operating system portion.

5. The computer system of claim 1, wherein said operating system further allocates discrete blocks of virtual address space within said shared address space region, said data structures including at least one data structure which records blocks allocated within said shared address space region.

6. The computer system of claim 5, wherein said at least one data structure which records blocks allocated within said shared address space region further associates access control information with each respective block allocated within said shared address space region, said access control information including whether a task is authorized to access the respective block; and wherein said operating system grants a task access to a block within said shared address space region based on the access control information associated with said block.

7. The computer system of claim 6, wherein said access control information associated with each respective block comprises an access control list associated with each respective block.

8. The computer system of claim 5, wherein said operating system further allocates physical storage to selective portions of virtual address space within a block, said data structures including at least one data structure which records physical storage allocated within the virtual address space of a block.

9. A method of operating a multi-tasking computer system, said multi-tasking computer system concurrently executing a plurality of tasks, said method comprising the steps of:

defining a plurality of overlapping virtual address space mappings, each mapping being associated with a respective task executing on said multi-tasking computer system;

designating a fixed portion of a plurality of said virtual address space mappings as a shared address region, said fixed portion being less than the entire virtual address space, said shared address region occupying the same range of virtual addresses in each respective virtual address space mapping;

assigning to each of a first set of addressable entities in said computer system a respective range of addresses in said shared address region, each range of addresses assigned to an addressable entity being uniquely and persistently assigned to the entity, wherein the address range of an addressable entity shared by two or more tasks resides at the same address within each task's shared address space region; and assigning to each of a second set of addressable entities in said computer system at least one respective range of addresses, each respective range of addresses being in a respective virtual address space mapping, said ranges lying outside said shared address region.

10. The method of claim 9, wherein said multi-tasking computer system inherently designates a fixed portion of each virtual address space mapping associated with a task as a shared address region.

11. The method of claim 9, wherein said step of designating a fixed portion of a plurality of said virtual address space mappings as a shared address region selectively designates, with respect to each task, a fixed portion of the respective virtual address space mapping of the task as a shared address region.

12. The method of claim 11, wherein said step of designating a fixed portion of a plurality of said virtual address space mappings as a shared address region comprises:

receiving requests from a plurality of tasks to designate a fixed portion of the respective virtual address space mapping of each requesting task as a shared address region; and designating a fixed portion of the respective virtual address space mapping of each requesting task as a shared address region, in response to said requests.

13. The method of claim 9, wherein said computer system includes at least one processor defining a virtual address space, and said step of defining a plurality of overlapping virtual address space mappings comprises defining, for each task, a respective virtual address space mapping which includes the full range of addresses in the processor address space.

14. The method of claim 9, wherein said step of assigning to each of a first set of addressable entities in said computer system a respective range of addresses in said shared address region comprises:

allocating discrete blocks of virtual address space within said shared address space region; and recording, in at least one data structure of said computer system, blocks allocated within said shared address space region.

15. The method of claim 14, further comprising the steps of:

associating access control information with each respective block allocated within said shared address space region, said access control information including whether a task is authorized to access the respective block; and granting a task access to a block within said shared address space region based on the access control information associated with said block.

16. A computer operating system program product for supporting concurrent execution of a plurality of tasks on a computer system, said computer operating system program product comprising:

a plurality of instructions executable on a processor of said computer system and recorded on a computer readable medium;

wherein said plurality of instructions when executed on said processor maintain a plurality of data structures supporting operating system functions performed by said plurality of instructions executing on said processor;

wherein said plurality of instructions when executed on said processor allocate a plurality of overlapping task virtual address spaces, each task virtual address space being allocated to a respective task;

wherein said plurality of instructions when executed on said processor allocate, within a plurality of said task virtual address spaces, a shared address space region, said shared address space region occupying the same virtual address range within each respective task virtual address space, said shared address space region being less than the entire task virtual address space; and wherein said plurality of instructions when executed on said processor allocate, within said virtual address range occupied by said shared address space region, a plurality address ranges assigned to respective addressable entities, each respective one of said range of addresses being uniquely and persistently assigned to its respective addressable entity, and wherein the virtual address range of an addressable entity shared by two or more tasks resides at the same address within each task's shared address space region.

17. The computer operating system program product of claim 16, wherein said plurality of instructions when executed on said processor selectively allocates, with respect to each task, said shared address space region within the virtual address space of the respective task, said data structures including at least one data structure which records whether said shared address space region has been allocated within the virtual address space of a task.

18. The computer operating system program product of claim 16, wherein said computer operating system comprises:
   a base operating system portion, said base operating system portion including instructions supporting concurrent execution of a plurality of tasks and concurrent allocation of a plurality of overlapping task virtual address spaces; and
   a shared address space server portion, said shared address space server portion including instructions supporting said shared address space region, said shared address space server portion responding to calls from said base operating system portion.

19. The computer operating system program product of claim 16, wherein said plurality of instructions when executed on said processor further allocate discrete blocks of virtual address space within said shared address space region, said data structures including at least one data structure which records blocks allocated within said shared address space region.

20. The computer operating system program product of claim 19,
   wherein said at least one data structure which records blocks allocated within said shared address space region further associates access control information with each respective block allocated within said shared address space region, said access control information including whether a task is authorized to access the respective block; and
   wherein said plurality of instructions when executed on said processor grant a task access to a block within said shared address space region based on the access control information associated with said block.

21. The computer operating system program product of claim 20, wherein said access control information associated with each respective block comprises an access control list associated with each respective block.

22. The computer operating system program product of claim 19, wherein said plurality of instructions further allocate physical storage to selective portions of virtual address space within a block, said data structures including at least one data structure which records physical storage allocated within the virtual address space of a block.

23. A shared address space server program product for a base computer operating system, said base computer operating system supporting concurrent execution of a plurality of tasks on a computer system and allocating a plurality of overlapping task virtual address spaces, each task virtual address space being allocated to a respective task, said shared address space server program product comprising:
   a plurality of instructions executable on a processor of said computer system and recorded on a computer readable medium;
   wherein said plurality of instructions when executed on said processor respond to calls from said base operating system;
   wherein said plurality of instructions when executed on said processor allocate, within a plurality of said task virtual address spaces, a shared address space region, said shared address space region occupying the same virtual address range within each respective task virtual address space, said shared address space region being less than the entire task virtual address space; and
   wherein said plurality of instructions when executed on said processor allocate, within said virtual address range occupied by said shared address space region, a plurality address ranges assigned to respective addressable entities, each respective one of said range of addresses being uniquely and persistently assigned to its respective addressable entity, and wherein the virtual address range of an addressable entity shared by two or more tasks resides at the same address within each task's shared address space region.

24. The shared address space server program product of claim 23,
   wherein said plurality of instructions when executed on said processor selectively allocates, with respect to each task, said shared address space region within the virtual address space of the respective task; and
   wherein said plurality of instructions when executed on said processor maintain at least one data structure supporting functions performed by said plurality of instructions executing on said processor said at least one data structure including at least one data structure which records whether said shared address space region has been allocated within the virtual address space of a task.

25. The shared address space server program product of claim 23,
   wherein said plurality of instructions when executed on said processor further allocate discrete blocks of virtual address space within said shared address space region; and
   wherein said plurality of instructions when executed on said processor maintain at least one data structure supporting functions performed by said plurality of instructions executing on said processor, said at least one data structure including at least one data structure which records blocks allocated within said shared address space region.

26. The shared address space server program product of claim 25, wherein said plurality of instructions further allocate physical storage to selective portions of virtual address space within a block, said at least one data structure including at least one data structure which records physical storage allocated within the virtual address space of a block.

27. A multi-tasking computer system having a processor defining a processor address space, said multi-tasking computer system comprising:
   means for supporting concurrent execution of a plurality of tasks on said computer system;
   means for concurrently allocating a plurality of overlapping task virtual address spaces, each task virtual address space being contained within said processor address space, and each task virtual address space being allocated to a respective task;

means for allocating, within a plurality of said task virtual address spaces, a shared address space region, said shared address space region occupying the same virtual address range within each respective task virtual address space, said shared address space region being less than the entire task virtual address space; and means for persistently and uniquely assigning address ranges to addressable entities within said shared address space region, wherein the virtual address range of an addressable entity shared by two or more tasks resides at the same address within each task's shared address space region.

28. The computer system of claim 27, further comprising:

means for selectively determining, with respect to each of a plurality of tasks, whether said shared address space region will be allocated within the respective task virtual address space of the task;

wherein said means for allocating a shared address space region allocates said region in response to said means for selectively determining whether said shared address space region will be allocated.

29. The computer system of claim 27, wherein said operating system further comprises:

means for allocating discrete blocks of virtual address space within said shared address space region.

30. The computer system of claim 29, wherein said operating system further comprises:

means for associating access control information with each respective block of virtual address space, said access control information including whether a task is authorized to access the respective block;

means for determining whether a task is authorized to access a block based on the access control information associated with said block; and means, responsive to said means for determining whether a task is authorized to access a block, for granting a task access to a block only if said task is authorized to access said block.

31. The computer system of claim 30, wherein said access control information associated with each respective block comprises an access control list associated with each respective block.

\* \* \* \* \*